(12) United States Patent
Helman et al.

(10) Patent No.: US 8,136,164 B2
(45) Date of Patent: Mar. 13, 2012

(54) MANUAL OPERATIONS IN AN ENTERPRISE SECURITY ASSESSMENT SHARING SYSTEM

(75) Inventors: Yair Helman, Kefar Neter (IL); Efim Hudis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 850 days.

(21) Appl. No.: 12/038,805

(22) Filed: Feb. 27, 2008

(65) Prior Publication Data

US 2009/0217381 A1    Aug. 27, 2009

(51) Int. Cl.
  G06F 11/00    (2006.01)
  G06F 12/14    (2006.01)
  G06F 12/16    (2006.01)
  G06F 23/00    (2006.01)

(52) U.S. Cl. ........................................................ 726/25
(58) Field of Classification Search ...................... 726/25
  See application file for complete search history.

(56) References Cited

U.S. PATENT DOCUMENTS

| | | | |
|---|---|---|---|
| 6,530,024 B1 | 3/2003 | Proctor | |
| 7,178,166 B1 | 2/2007 | Taylor et al. | |
| 2004/0230835 A1 | 11/2004 | Goldfeder et al. | |
| 2005/0102534 A1* | 5/2005 | Wong | 713/201 |
| 2005/0257267 A1 | 11/2005 | Williams et al. | |
| 2006/0136986 A1 | 6/2006 | Doolittle | |
| 2006/0156408 A1 | 7/2006 | Himberger et al. | |
| 2007/0150957 A1 | 6/2007 | Hartrell et al. | |

OTHER PUBLICATIONS

"Symantec Enterprise Security Manager Application Modules Extend Policy Enforcement and Security Assessment", http://www.symantec.com/press/2002/n020806a.html.
Sorensen, "Juniper Networks NetScreen-IDP's Enterprise Security Profiler (ESP)—How ESP Compares to Traditional Technologies", Copyright © 2004, Juniper Networks, Inc., pp. 1-6.
"Avaya Global Services—Avaya Enterprise Security Practice", pp. 1-9, 2003.

* cited by examiner

*Primary Examiner* — Kambiz Zand
*Assistant Examiner* — Stephen Sanders

(57) ABSTRACT

An enterprise-wide sharing arrangement uses a semantic abstraction, called a security assessment, to share security-related information between different security products, called endpoints. A security assessment is defined as a tentative assignment by an endpoint of broader contextual meaning to information that is collected about an object of interest. Endpoints may publish security assessments onto a security assessment channel, as well as subscribe to a subset of security assessments published by other endpoints. A specialized endpoint is coupled to the channel that performs as a centralized audit point by subscribing to all security assessments, logging the security assessments, and also logging the local actions taken by endpoints in response to received security assessments. Manual operations are supported by the specialized endpoint including manual approval of actions, security assessment cancellation, and manual injection of security assessments into the security assessment channel.

20 Claims, 18 Drawing Sheets

MANUAL OPERATIONS IN AN ENTERPRISE SECURITY ASSESSMENT SHARING SYSTEM

BACKGROUND

In an enterprise computing environment, for example, an office of a business, a number of personal computers, workstations, servers and the like, along with other devices such as mass storage subsystems, internal network interfaces, and external network interfaces, are typically interconnected to provide an integrated environment in which information may be generated, accessed from external sources, and shared among various users. Commonly, users perform a variety of operations including order receipt, manufacturing, shipping, billing, inventory control, document preparation and management, e-mail, web browsing, and other operations in which creation, access, and sharing of data is beneficial.

Currently, security is typically provided for an enterprise using a variety of different security products that are each normally arranged to monitor only a partial portion of enterprise-wide data. That is, security products are arranged as separate local "islands" where each product monitors, assesses, and takes action with respect to different parts of the data within the enterprise. For example, an enterprise may utilize a combination of security products such as a product that protects host computers in the enterprise, an edge firewall product, a network intrusion detection system ("NIDS") product, a network access protection ("NAP") product, and other discrete security products in order to provide security for the various different parts of the enterprise.

While these security products often perform satisfactorily in many applications, detection of security incidents often suffers from undesirably high levels of false-positive and false-negative occurrences as a result of the monitoring of only partial enterprise security data. It has also been difficult to provide effective common management across all the enterprise security product islands. Current attempts to correlate enterprise-wide security data have high management and maintenance costs and have problems in scaling. More effective enterprise security management would be desirable to enable a single enterprise-wide view to enable security administrators to define and enforce clear, simple, and unified enterprise-wide policies for automatic responses to security incidents.

This Background is provided to introduce a brief context for the Summary and Detailed Description that follows. This Background is not intended to be an aid in determining the scope of the claimed subject matter nor be viewed as limiting the claimed subject matter to implementations that solve any or all of the disadvantages or problems presented above.

SUMMARY

An enterprise-wide sharing arrangement called "ESAS—Enterprise Security Assessment Sharing" is provided in which a semantic abstraction, called a security assessment, is created to enable sharing of security-related information between different security products, called endpoints, in an enterprise security environment. A security assessment is defined as a tentative assignment by an endpoint of broader contextual meaning to information (i.e., data in some context) that is collected about an object of interest in the environment such as a computer, user, service (e.g., a website), data, or the enterprise as a whole. The security assessment utilizes a concise vocabulary for an endpoint to declare that an object in the environment falls into a particular assessment category such as "compromised" or "under attack" along with the severity (e.g., low, medium, high, critical) of the detected incident.

A security assessment is tentative because it is subject to some uncertainty and is valid for a limited period of time. The tentative nature of a security assessment is reflected in two of its components: a fidelity field which expresses the level of confidence the endpoint has in its assignment of contextual meaning, and a time-to-live ("TTL") field which reflects the endpoint's estimate of the time period for which the security assessment is expected to be valid. Thus, for example, a security assessment may be used by an endpoint to declare, in light of that endpoint's current understanding of one or more security incidents, that a particular machine is compromised, with a critical level of severity, with medium fidelity, and having a TTL of 30 minutes. A variety of types of security assessments may be used in any given enterprise security environment having, for example, various combinations of assessment category and object type.

Endpoints are enabled with functionality to publish security assessments onto a security assessment channel operating in the environment, as well as subscribe to a subset of available security assessments published by other endpoints. The security assessments existing in the environment that are active (i.e., those having a TTL which indicates the assessments are still valid) function to provide a security context that gives such ESAS-enabled endpoint a new way to look at its own locally-available information. That is, the security context enables the ESAS-enabled endpoint to combine or correlate evidence from security assessments received from a variety of different sources, and across object types, in order to significantly enhance the quality of its detection of potential security incidents. The ESAS-enabled endpoint then makes a decision as to what local action or response is appropriate for each type of security assessment (whether received from another endpoint or internally generated by the endpoint itself) in accordance with a set of response policies. Incident detection is both efficient and cost-effective because the security context enables distributed processing of enterprise-wide information, in the form of security assessments, without the burden of sharing large amounts of raw data throughout the enterprise (most of which is completely irrelevant due to the lack of any context). ESAS-enabled endpoints are further arranged to roll back the local action upon expiration of the security assessment that prompted the local action (i.e., when the security assessment exceeds the time-to-live specified in the TTL field), or when a security assessment is manually cancelled (as discussed below).

In various illustrative examples, a specialized endpoint called an ESAS central server is coupled to the security assessment channel that performs as a centralized audit point by subscribing to all security assessments, logging the security assessments, and also logging the local actions taken by endpoints in response to security incidents in the environment. The ESAS central server provides administrators with a comprehensive view of the history and current status of the enterprise as a whole and of each ESAS-enabled endpoint. The utilization of the security assessments enables an administrator to compactly and efficiently configure response policies to incidents that are detected across the entire enterprise. The security assessments function as natural anchors, or starting points, to define enterprise-wide security response policies. A streamlined and consistent management interface is thus enabled to define the desired responses for each type of security assessment across the entire enterprise.

The ESAS central server, or a separate ESAS administrator ("admin") console, may also be arranged to support a variety of manual operations that can be performed by the administrator when dealing with security assessments. These manual operations include the ability of the administrator to set the response policies so that selected responses (i.e., local actions taken by an ESAS-enabled endpoint) are set to be triggered automatically in response to receipt of a given security assessment, while other responses are set to require manual approval by the administrator before they are implemented by an endpoint.

The administrator may also be provided with an ability to manually cancel a security assessment that has been published into the channel by an ESAS-enabled endpoint. The administrator may cancel a security assessment, for example, when it is determined to be incorrect (e.g., it relates to a false positive detection of a security incident), or the underlying security incident or problem which triggered the security assessment has been resolved which makes the security assessment no longer relevant. A cancellation message from the ESAS central server is then sent through the security assessment channel which, when received by the ESAS-enabled endpoints, causes any local action taken as a result of the published security assessment to be rolled back in response to the cancellation. When the ESAS-enabled endpoint that originally published the security assessment (that was later manually cancelled) receives the cancellation message, the issuance of any new security assessments about the same object for the same reason is suppressed even though the endpoint may continue to detect the same pattern that triggered the original security assessment. Such suppression typically occurs over a period of time that equals the TTL of the original security assessment.

In addition to being able to set response policies to accommodate manual approval, and having the ability to manually cancel a security assessment, the administrator may also be provided with a facility to create new security assessments that can be manually injected into the security assessment channel. Such manually injected security assessments use the same compact and precise vocabulary as assessments generated by the ESAS-enabled endpoints, including assessment category (e.g., "compromised," "vulnerable"), severity, fidelity, and TTL, for example. A security assessment can be generated and then manually injected when an administrator learns of a security incident or issue from external information that the ESAS system cannot access on its own, or would not know how to look at such information.

For example, the administrator may manually inject a security assessment into the ESAS channel based on an investigation of a possible security incident, or after receiving a report by telephone from a user regarding unusual behavior of a local host machine or an external URL. The ESAS-enabled endpoints will treat a manually injected security assessment as they do other assessments and will take actions in accordance with the response policies. The administrator can thus manually inject a security assessment as a way to educate the ESAS system and take advantage of the system's largely automated responses to effectively and efficiently deal with security incidents that the administrator learns of or discovers.

The present ESAS sharing arrangement provides a number of advantages. By employing a security assessment having a concise vocabulary, overall data complexity in the enterprise is drastically reduced and only meaningful information is shared between endpoints. Use of the security assessment also eliminates the need to collect large amounts of raw data in a central storage location, and thereby enables highly scalable enterprise security solutions to be built on a very cost effective basis. In addition, a new endpoint may be readily deployed with on-demand extensibility. Security assessments may be shared between the new endpoint and existing endpoints without the need to reconfigure any of the response policies within existing endpoints. The new endpoint simply functions as a new source of security assessments using a semantic abstraction that the existing endpoints already understand. The utilization of security assessments also enables enterprise-wide security policies to be established using a very compact and clear methodology, without needing to understand all of the possible security events that every endpoint may generate in the enterprise, and then try to describe the responsive action for each event.

The manual operations capabilities provide even further benefits by enabling administrators to exercise more control over responses taken by the ESAS system. Such control can be important when first deploying an ESAS system where the administrator may wish to gain confidence that the response policies are appropriately set before allowing fully automatic responses to take place. Or, there may be situations even after an ESAS system is fully deployed and tested where critical assets are at issue and the administrator would prefer to have the opportunity to review and approve responses before they are implemented. With assets such as domain controllers or web servers that support financial transactions, administrators may want to double check that a security incident has in fact occurred that is serious enough to justify the planned response. This may be the case particularly if the planned response is "harsh" and involves, for example, the asset being shut down or having access to it restricted, which could possibly have a large business impact by affecting productivity, revenue, or costs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
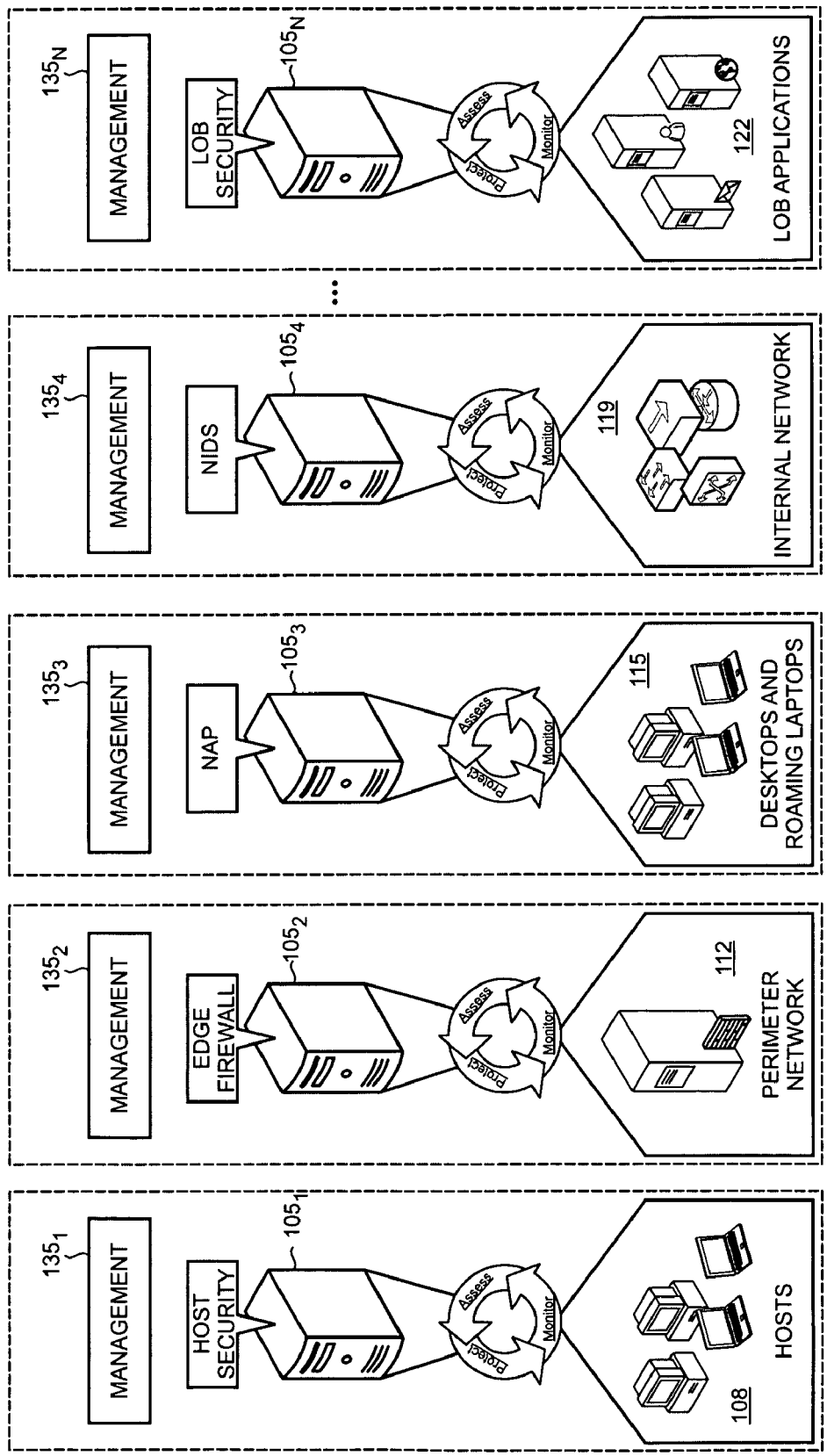
FIG. 1 shows an illustrative enterprise security environment in which the present enterprise security assessment sharing may be implemented.

Analysis of current enterprise security solutions indicates that there are still significant opportunities for addressing customer needs. For example, each separate security product tends to have high rates of false positive and false negative detection of security incidents such as those produced through actions of malware or malicious users. Such low fidelity detection occurs because data from a single type of source (i.e., a subset of the enterprise-wide data) does not normally provide the context needed to make an accurate assessment of the security incident.

The use of automatic actions or responses is very infrequent as a result of the low fidelity detection since confidence in the validity of the detected incident is low. In addition, the typical response to a detected incident tends to be very harsh, for example, a user or machine may be disconnected from the network. Since such harsh actions generally impose significant costs to business activity in the enterprise, automation of such actions based on low fidelity detection is not generally performed.

Upon detection of an incident of interest, current security products typically perform investigation to determine the validity of the detection (i.e., whether the incident is true or false) and what action to take in response. Significant resources are expended on investigation to review the detailed data that is collected which may be relevant to the detected incident. Because it is not feasible to collect all data at all times, a security product collects only a subset of the available data through application of policies defined by an administrator. Such policies are often static and are commonly defined based on the storage capacity of the collection system, and not necessarily by the relevance of the incident data or the data source.

When an incident is detected, application of the policies typically results in a review of the data which triggered the detection. When this data is deemed insufficient to generate a high fidelity response, typically even more data is collected. For example, all of the data traffic into and out of a suspected compromised machine may be monitored. In many cases, a large amount of data is collected but is never used and has statistical significance only as noise. Consequently, many present security products collect an often overwhelming amount of noise, but not enough relevant data is collected.

Another area for improvement is the management and coordination of responses throughout the enterprise. Current enterprise security products inherently provide localized responses to incidents detected in each separate island. Since the security products are isolated, the possible response options are limited to that part of the enterprise in which the particular security product operates. That is, actions and responses are capable of being defined in one security product island for separate incidents that are detected, but there is no ability to describe a desired action which may be more effective when it is applied in another part of the enterprise, or on a global basis. There is currently no single management point to enable enterprise-wide definition and enforcement of response policies to security incidents. Nor does a unified response channel and language/protocol exist by which each island can communicate to thereby notify the others that something has occurred or an action needs to be taken. The lack of management and coordinated responses results in significant costs being incurred for manual integration and correlation of data across the islands in the enterprise.

Turning now to the drawings where like reference numerals indicate like elements, FIG. 1 shows an illustrative enterprise security environment 100 in which a variety of security products $105_{1, 2 \ldots N}$, called endpoints, are deployed. It is emphasized that the number and type of endpoints 105 shown in FIG. 1 are merely illustrative and the specific number of endpoints can be scaled up or down, and different types of security products/endpoints can be utilized, depending on the requirements of a specific application of enterprise security assessment sharing. For example, in addition to those shown in FIG. 1 and described below, web application protection products, SEM/SIM (Security Event Management/Security Incident Management) products, operational heath monitoring and configuration management products (e.g., Microsoft Windows® Software Update Services, Microsoft Operations Manager), or identity management products (e.g., Microsoft Active Directory) are also usable in some applications.

In enterprise security environment 100, a host security endpoint $105_1$ is deployed to protect, assess, and monitor a plurality of host computers 108 in the enterprise environment 100. A commercial example of the host security endpoint $105_1$ is Microsoft Forefront Client Security® ("FCS") which provides unified malware protection for the enterprise's desktops, laptops, and server operating systems.

An edge firewall $105_2$ is a security product that is arranged to protect the enterprise environment 100 from Internet-based threats while providing users with remote access to applications and data through a perimeter network 112. Edge firewall $105_2$ may be embodied by, for example, a Microsoft Internet Security and Acceleration® ("ISA") server.

A NAP security endpoint $105_3$ performs computer health policy validation by ensuring ongoing compliance with health policies defined by an administrator. Typically, access is restricted for computers (e.g., desktops and roaming laptops 115) monitored by the NAP security endpoint $105_3$ that do not comply with system health requirements.

A NIDS security endpoint $105_4$ analyzes traffic inside the enterprise 100 over an internal network 119. The NIDS security endpoint $105_4$ operates to detect malicious activity such as denial of service attacks port scans by monitoring network traffic on the internal network 119.

A line-of-business security endpoint $105_N$ protects various line-of-business applications 122. Line-of-business applications 122 include, for example, an e-mail application such as Microsoft Exchange® that is used in the enterprise 100. Security endpoint $105_N$ typically monitors e-mail to provide anti-virus and anti-spam protection.

Each of the security endpoints 105 in the enterprise 100 are normally arranged as individual islands, as indicated by the dashed rectangles in FIG. 1. Accordingly, each security endpoint 105 is arranged for monitoring a subset of the available data in the enterprise 100 and for performing localized actions in response to a detected incident. In addition, each endpoint typically includes a local management function $135_{1, 2 \ldots N}$. As noted above, the individual local management functions are not generally integrated to provide a single point of management.

Figure 2:
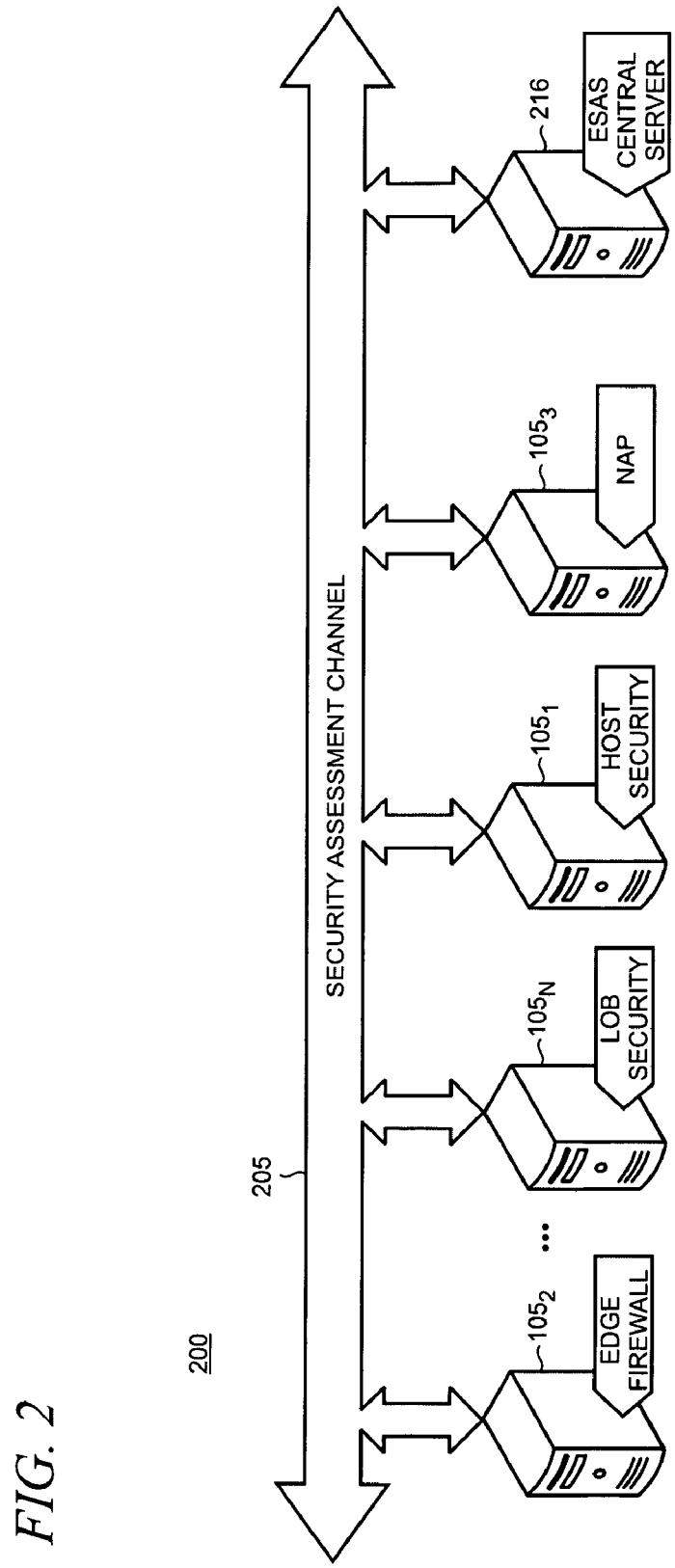
FIG. 2 shows an illustrative enterprise security assessment sharing arrangement in which a channel is provided to enable a security assessment to be shared among multiple endpoints.

FIG. 2 shows an illustrative ESAS system 200 in which a channel 205 is provided to enable a semantic abstraction called a "security assessment" to be shared among multiple endpoints using a language/protocol that is commonly-utilized at each endpoint. The security assessment channel 205 facilitates a publish/subscribe model used by the endpoints for connecting the sources of security assessments (publishers) to the consumers of the security assessments (subscribers). As shown, both the publishers and subscribers on the security assessment channel 205 are endpoints 105.

The endpoints 105 are isolated from the mechanics of the actual transport and management of the publish/subscribe model through a semantic abstraction layer that is arranged to simplify interactions with the security assessment channel 205. The abstraction layer comprises tables describing the security assessment types to which the endpoints subscribe, and tables describing the security assessment types that endpoints publish (as described below, not all endpoints generally subscribe to all security assessment types). In addition, the abstraction layer provides an API (application programming interface) for reading received security assessments, and an API for generating security assessments.

A specialized endpoint, ESAS central server 216, is coupled to the security assessment channel 205 and performs as a centralized audit point for the ESAS system 200. Accordingly, the ESAS central server 216 subscribes to all security assessments and permanently logs them. ESAS central server 216 also receives and logs messages from the endpoints that indicate the local actions that are taken by an endpoint. The ESAS central server 216 thus provides administrators with security assessment monitoring functionality that gives a comprehensive view of the history and current status of the enterprise as a whole, and each ESAS-enabled endpoint.

Figure 3:
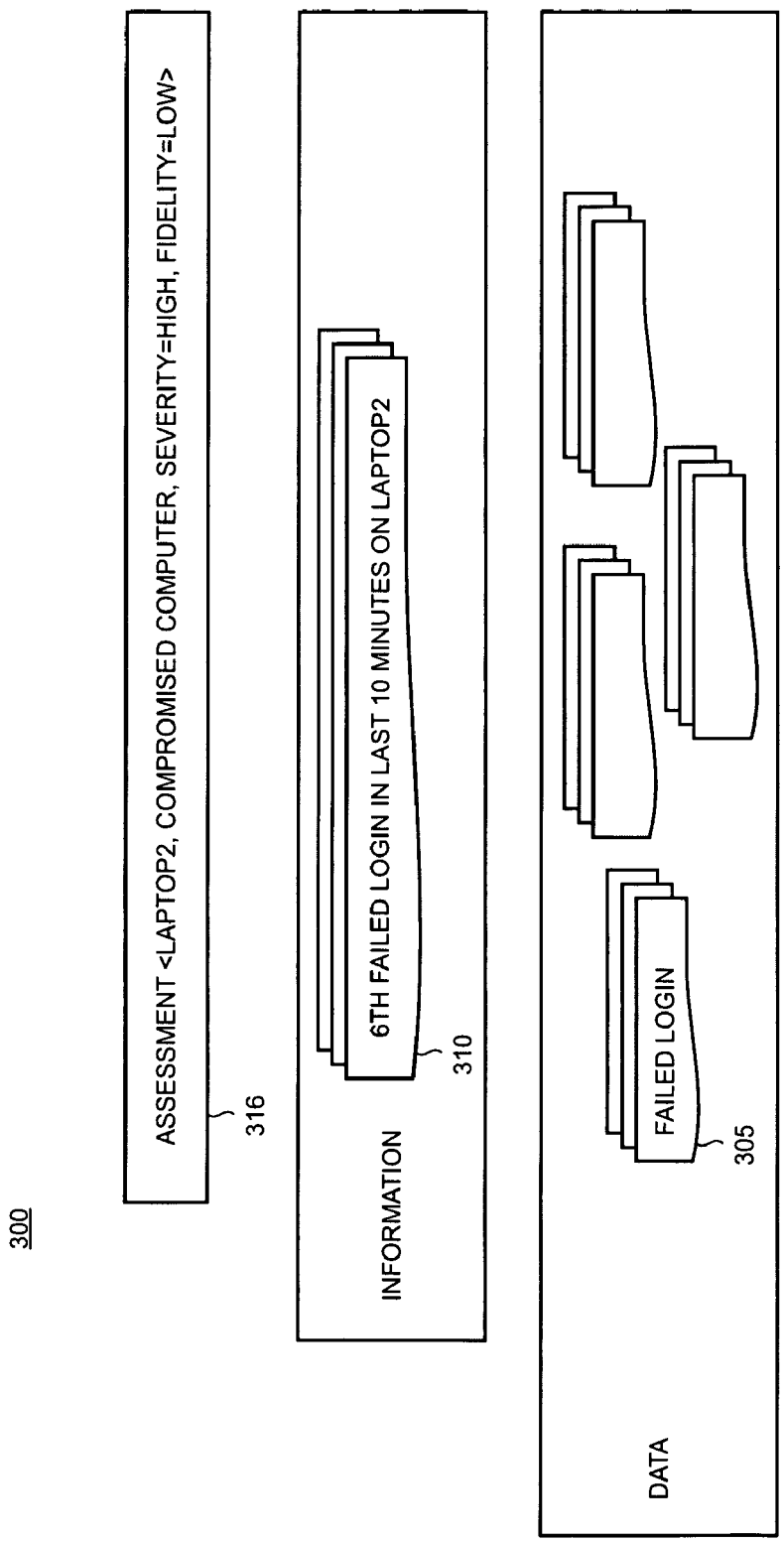
FIG. 3 shows an illustrative terminology hierarchy that underlies a security assessment.

FIG. 3 shows an illustrative terminology hierarchy 300 that underlies a security assessment. A security assessment is defined as a tentative assignment of security meaning, or category, to information. Information, as used here, is defined as data with some context. Data is defined as discrete items devoid of context. These definitions may be further described by way of an example. As shown in FIG. 3, a piece of data 305 is an event in an event log such as a failed login. Information 310 is data provided with context which, in this example, is that the failed login was the sixth such failure within 10 minutes on the same machine, a laptop named Laptop2. The security assessment 316, in this example, indicates that Laptop2 is categorized in a particular way, namely that it is assessed with a category of "Compromised," with high "severity," and where such assessment has low "fidelity" (these terms are defined and discussed below in more detail).

A security assessment may be performed on any object of interest in an enterprise security environment, such as a user or a device. In this illustrative example, assessments include four main object types: 1) Host—assessments about computers in an enterprise; 2) User—assessments about users or accounts in an enterprise; 3) Service—assessments about a service provided to the enterprise such as a URL (Uniform Resource Locator) of a web site that has a reputation as being malicious; 4) Enterprise—assessments about the enterprise as a whole or a well-defined subset of the enterprise such as a department, subnet, site, or branch; and 5) Data—assessments about business-related data (e.g., as found in documents, e-mail, business data in a database, etc.) that is present or accessed by objects in the enterprise.

It is emphasized that these object types are merely illustrative, and other object types may be used as required by specific scenarios. In most applications of enterprise security assessment sharing, endpoints only publish, and subscribe to, a subset of all of the available security assessment types since particular endpoints are generally going to have interest in particular objects in the enterprise environment. In addition, while some endpoints will be both publishers and subscribers, there is no requirement for every endpoint to support both functionalities. For these reasons, the publish/subscribe model used herein is said to be loosely-coupled.

Table 1 below shows an illustrative set of assessment categories (i.e., types), and their mapping to specific object types that may be contained in a typical security assessment:

TABLE 1

| Object Type | Assessment category | Description |
| --- | --- | --- |
| Host | Vulnerable machine | Machine had vulnerable configuration or is missing some patches. |
| | Compromised machine | An endpoint detected some evidence that the machine might be compromised by a malicious software/user. |
| | Machine under attack | An attack attempt was detected without any evidence for success |
| | Machine of interest | An endpoint has a general suspicion about a machine without the ability to pin point what is wrong. |
| User | Compromised user | An endpoint detects some evidence that the user/account might be compromised. |
| | User under attack | An attack attempt was detected without any evidence for success |
| | Malicious user | An endpoint or an administrator detects that a user is a malicious one and actively (i.e., on purpose) performs illegal actions. |
| | User of interest | An endpoint has a general suspicion about a user/account without the ability to pin point what is wrong. |
| Enterprise | Enterprise under attack | An endpoint detects that an enterprise is under attack without evidence that a significant part of the enterprise is compromised. |
| | Compromised enterprise | An endpoint detects that a significant part of the enterprise is compromised (machines/users). |
| Service (e.g., a website) | Malicious | A URL (Uniform Resource Locator) has a malicious reputation. |
| Data | Compromised | An endpoint detects some evidence that some business-related data in the enterprise is compromised. |
| | Corrupted | An endpoint detects some evidence that some business-related data in the enterprise is corrupted. |

In the present illustrative ESAS arrangement, four levels of severity are typically utilized: low, medium, high, and critical. Three levels of fidelity are typically utilized: low medium, and high. Note that the number of levels for both severity and fidelity can be arranged to be different depending on the assessment category. For example, it is possible to use the three severity levels for the assessment category of "vulnerable machine" while using four severity levels for the assessment category of "compromised machine." The particular choice of number of levels to be utilized will depend on the requirements of a specific application of the present enterprise security assessment sharing.

A security assessment uses information that is available at the time the assessment is made and relies on the particular security expertise and knowledge that is resident in the endpoint that produces it. A security assessment is tentative because confidence in any particular event can never be absolute, and also because the assessment is temporary in nature as it relies on information that is present at the time it was produced. At some future time, other information will be available, so the security assessment may change.

The tentative nature of a security assessment is reflected in two fields included in each assessment—fidelity and time-to-live ("TTL"). The fidelity field provides a way for endpoints to express their confidence level in an assignment of a broader contextual meaning to information being analyzed. The TTL field enables endpoints to reflect the best estimate of the time period for which the security assessment is expected to be valid. Or alternatively, the TTL field provides the best estimate for a future security assessment update. When a TTL expires, an endpoint that takes actions based on a security assessment to which it subscribes is expected to roll back such actions when the TTL of that assessment expires. Thus, the TTL provides a safety valve functionality to prevent a user or a machine from getting inappropriately trapped with restricted access due to a false positive, or the loss of a message somewhere in the enterprise. However, if such restricted access is indeed appropriate, then either a new security assessment may be generated to continue the restriction, or the TTL extended.

Figure 4:
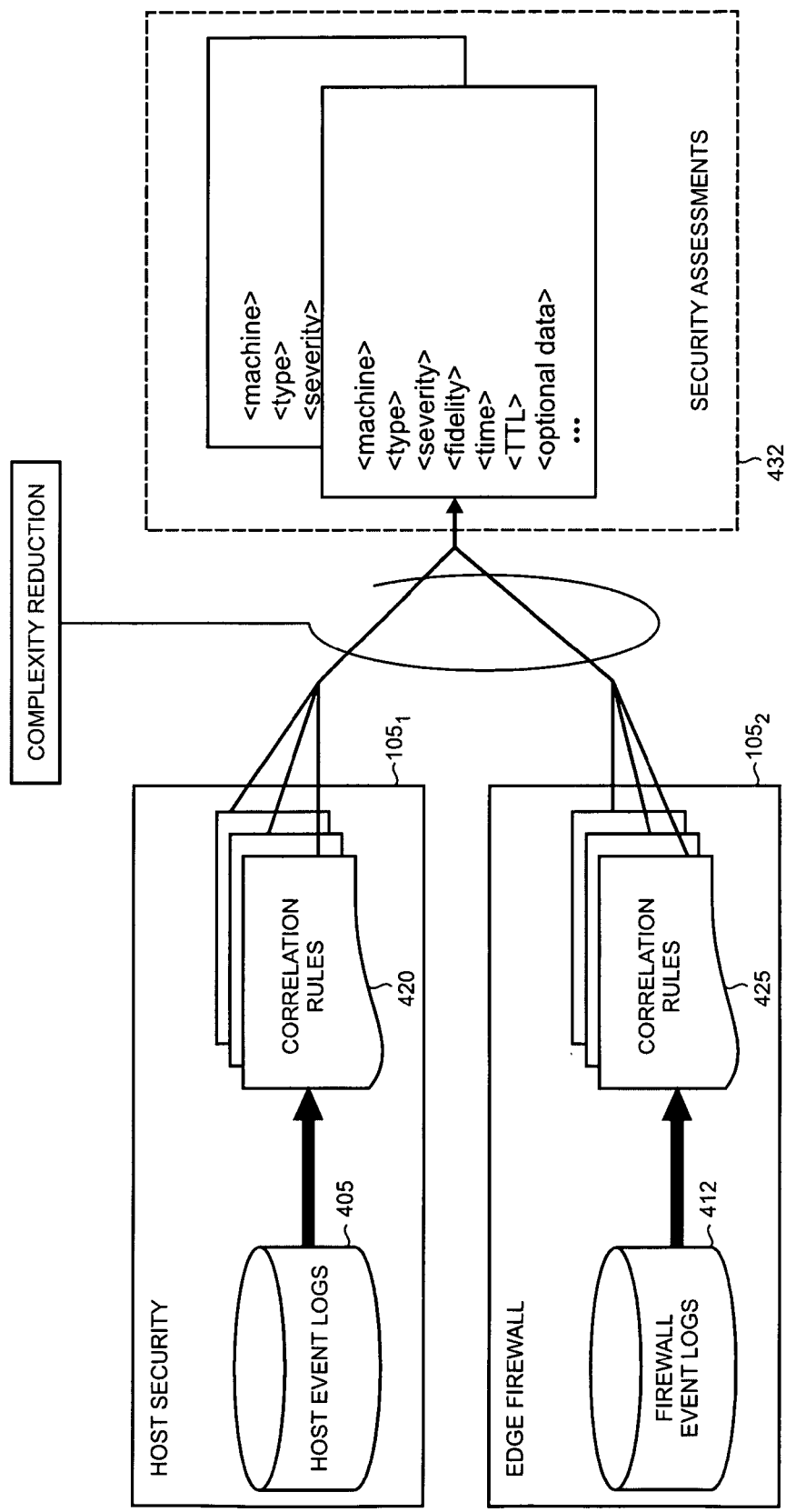
FIG. 4 shows two illustrative endpoints and the complexity reduction enabled by the utilization of the present security assessment arrangement.

The security assessment is designed to enable precise semantics (i.e., the meaning imparted by the categorization used in the security assessment) using a compact vocabulary. As shown in FIG. 4, two of the endpoints 105 in the enterprise log data about events that occur in their respective areas of interest. The host event logs 405 and firewall event logs 412 thus contain very large amounts of data. Typically, the data is processed in the respective endpoints using correlation rules 420 and 425 in order to identify events of interest. The correlation rules, which are often numerous, define the localized sponsors or actions taken responsibly to a detected event.

By comparison, the security assessments, indicated by reference numeral 432, contain only a relatively small amount of data. As security assessments are utilized to assign broad context to information, they provide answers to the questions: Who created the assessment? When? Why? For how long? And, on which object does the assessment apply? Thus, in order to make use of a security assessment, an endpoint need only understand the few assessment types of interest as compared with the unbounded number of information messages that result from application of the correlation rules. Accordingly, the complexity of the data collected by each endpoint is reduced by mapping information into one or more of the assessment types. Using security assessments thus enables relevant information to be provided to subscribing endpoints without requiring that large amounts of data or information be shared across the enterprise.

Table 2 below provides an illustrative set of fields that may be included in a typical security assessment.

TABLE 2

| Field | Description |
|---|---|
| Incident ID | A unique identifier that represents the incident for which a security assessment was created. Since there may be several assessments that are tied to the same incident (e.g., detection, response, approval, cancellation), this field also uses a correlation value |
| Instance ID | A unique identifier that represents a single security assessment message |
| Source | Endpoint type (e.g., host security, edge firewall, NAP, NIDS, etc.) and unique endpoint ID |
| Relates To | If an assessment was created responsively to other security assessments then this field will contain the list of all the assessment's incident IDs |
| Object type | host, user, reputation, enterprise, or other object type |
| Object ID | An identifier for the object. Endpoints often describe the same object in different ways. For example, a host can be identified by its FQDN (Fully Qualified Domain Name), IP (Internet Protocol), MAC (Media Access Control), or SMTP (Simple Mail Transfer Protocol) addresses, etc. |
| Category | Compromised, Vulnerable, Under Attack, etc. |
| Operation | Published (upon detection), response, approval, cancellation, etc. |
| Severity | Severity of the incident |
| Fidelity | Confidence of the endpoint in its detection of an incident |
| Creation time | GMT (Greenwich Mean Time) and local time |
| TTL | Time-to-Live in minutes |
| Description | A human-readable format that explains why the assessment was created |
| Data | Private information about why the assessment was created. Other endpoints may use this data for additional correlations |
| Response | (Optional) a compound node that contains the set of responses that were taken by the endpoint |
| By | (Optional) in case the assessment was approved/canceled/created by a user, this field will contain the name of the user |
| Version | Schema version of the assessment |

Using the fields in Table 2, a security assessment is capable of expressing the following events:

1. Detection. An endpoint executes some analysis to deduce that some abnormal behavior has occurred (compromised machine, vulnerable machine, compromised user, etc.);
2. Response. Endpoints take actions as a result of security assessments. An endpoint should notify the system (specifically, the ESAS central server 216 in FIG. 2) when actions are taken. Responses may include, for example, blocking traffic, triggering a scan, resetting a password, collecting more data about a machine, and similar actions. Note that some responses such as resetting a password or triggering a scan are intermittent, while other responses are persistent and need to be rolled back in order to be canceled;
3. Assessment approval. An administrator can approve assessments manually using an interface to the ESAS central server 216. Endpoints shall be notified upon such approval so they will perform the "required manual approval" responses;
4. Cancellation. An administrator or an endpoint can cancel an existing security assessment;
5. Response roll back. An endpoint notifies the system (ESAS central server 216 in FIG. 2) that it rolled back all responses/actions that were taken due to a specific assessment;
6. Health information assessments such as connectivity verifiers, latency checking, and error information;

7. Request for investigation data. This is a request from an endpoint to another endpoint to send all its data about an object collected in a given time period; and
8. Request for investigation data completed. This is a method for the endpoint to acknowledge that it performed the request. The response to the request is sent after the data was stored/sent.

In this illustrative example of enterprise security assessment sharing, each endpoint is arranged to perform at least some of the tasks noted below. In some arrangements, each endpoint is enhanced with additional functionality as required to perform such tasks through use of a discrete ESAS agent. Alternatively, the enhanced functionality may be more tightly integrated into the core functionality provided by the endpoint, and a separate or discrete agent may not necessarily be embodied in the endpoint. Such tasks include:

1. Generating new security assessments based on the locally available information about the monitored system and the security context;
2. Subscribing to a subset of available security assessments from other endpoints;
3. Processing incoming security assessments to thereby influence the security context. The processing can result in the generation of new security assessments;
4. Taking local actions according to response policies;
5. Rolling back (self-recovery) a local action when an assessment that caused it expires (i.e., expiration of the associated TTL).

Figure 5:
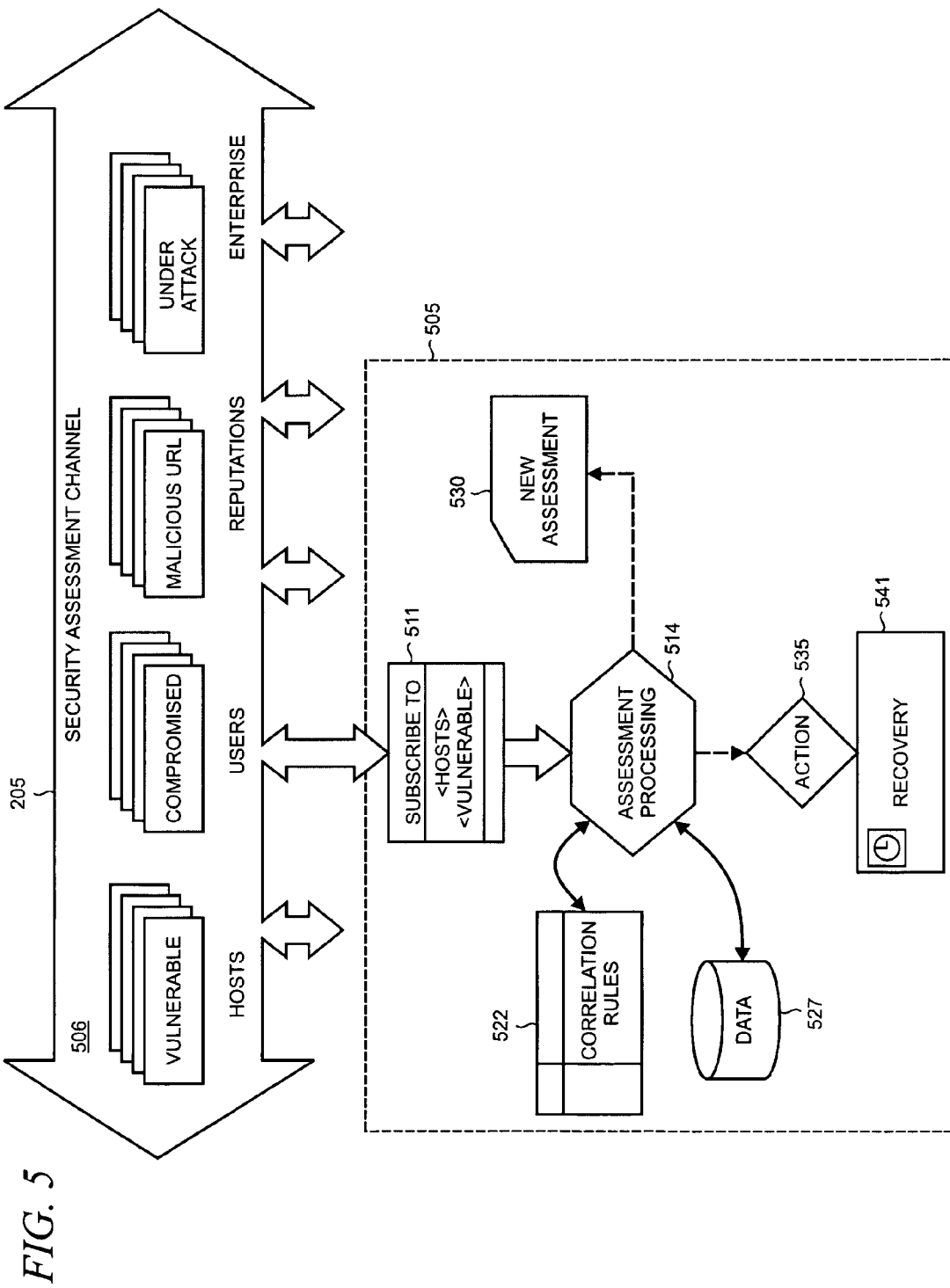
FIG. 5 shows an illustrative example of functionality disposed in an endpoint that enables sharing of security assessments.

FIG. 5 shows an illustrative example of an ESAS agent 505 disposed in an endpoint which subscribes to a subset of available assessments from other endpoints $105_{1, 2 \ldots N}$ (FIG. 1) over the security assessment channel 205. As noted above, the functionality provided by ESAS agent 505 may alternatively be directly integrated with the core functionality of the endpoint.

A plurality of security assessments 506 are available for each of the security assessment types (i.e., hosts, users, reputations, and enterprise). As indicated by reference numeral 511, in this illustrative example, ESAS agent 505 subscribes to security assessments having a "host" object type with an assessment category of "vulnerable." It is emphasized that a particular combination of object type and assessment category that is of interest can be different for different endpoints. Again, using the loosely coupled publish/subscribe model there is no requirement that every endpoint subscribes to every security assessment.

At process block 514, the endpoint processes the received security assessment using correlation rules 522 and locally-available data 527 that may be of some relevance. The outputs of such an assessment process include the generation of the new assessment 530 and/or an invocation of a local action 535. As noted above, such local action is subject to roll-back 541 (i.e., self-recovery) when the received assessment expires according to the TTL field contained therein.

ESAS agent 505 interprets security assessments according to the following rules:

1. In generating a security assessment about a particular object, an endpoint can take into account any combination of the following:
    a) All of the locally-available information about the object or any other objects the endpoint monitors;
    b) All the currently active security assessments (i.e., those having an unexpired TTL) the endpoint has received;
    c) All the local actions the endpoint has taken in the past.
2. All of the endpoints in the present enterprise security assessment sharing arrangement comply with the principle that all of the sets of locally-available information in the endpoints are mutually exclusive. That is the present arrangement has no more than one endpoint processing a particular piece of local information.
3. Security assessments are typically interpreted as describing an endpoint's assessment about the current and future security state of an object.

It is important to note that the Rule 2 refers to the exclusivity of information and not data as these terms were defined above. Two endpoints can process the same or overlapping data sources provided that the information they extract from the data and later use to generate assessments is exclusive.

To illustrate the implications of Rule 3 consider the following example where a scheduled antivirus scan of a machine detects and removes a piece of known malware. Based on this detection, other locally available information, a received currently active assessment, and on the endpoint's embedded knowledge about current security incidents, the endpoint may conclude one of the following: 1) a machine was infected in the past, but is now clean and does not pose any additional future security risk; 2) The machine was infected and, while the particular malware was removed, it is possible or likely that it still poses a security risk. According to Rule 3, an endpoint should generate a security assessment about the machine in the latter case and not generate one in the former.

Figure 6:
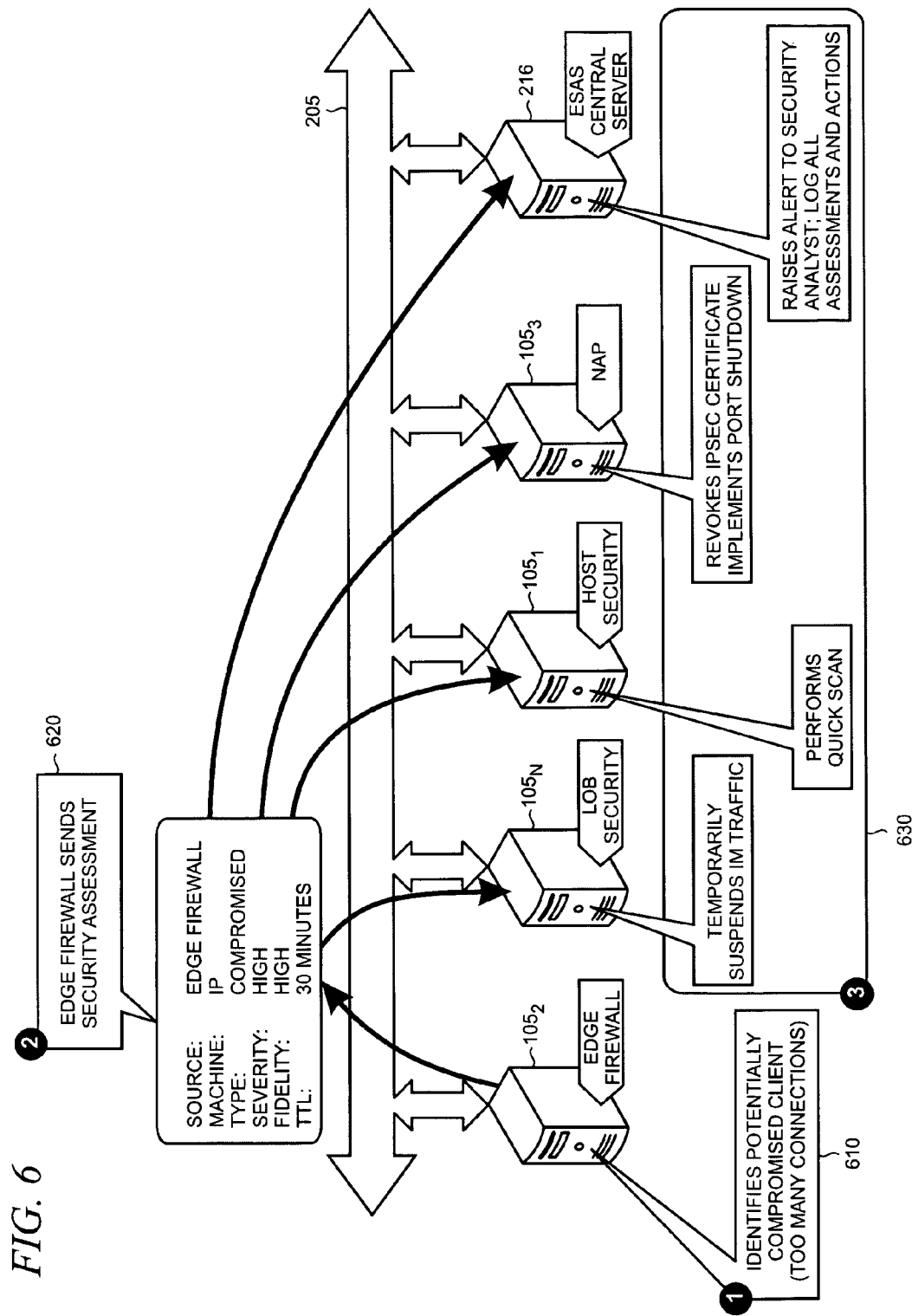
FIG. 6 is a diagram of a first illustrative scenario in which a plurality of ESAS-enabled endpoints are coupled to a security assessment channel and a detected incident at one endpoint triggers responses at multiple other endpoints.

FIG. 6 is a diagram of a first illustrative scenario in which a plurality of ESAS-enabled endpoints are coupled to the security assessment channel 205, and a detected incident at one endpoint triggers responses at multiple other endpoints. This illustrative scenario is described in three stages. As indicated by reference numeral 610, the edge firewall $105_2$ first identifies a potentially compromised client, for example, because it creates so many connections to the perimeter network 112 (FIG. 1) that the most likely explanation for the behavior is the existence of a security compromise. Second, the edge firewall $105_2$ sends a security assessment that indicates the particular client is "compromised" with high severity and high fidelity, as indicated by reference numeral 620, over the security assessment channel 205 to subscribing endpoints.

Third, the subscribing endpoints $105_{1, 3 \ldots N}$ and the ESAS central server 216 which receive the security assessment apply their specific security expertise through the application of their own correlation rules and locally-available data to trigger an appropriate action. As collectively indicated by reference numeral 630 in FIG. 6, the host security endpoint $105_1$ performs a quick scan. The NAP endpoint $105_3$ revokes the IP security certificate for the identified compromised client and implements a port shutdown. The line-of-business security endpoint $105_N$ temporarily suspends instant messaging ("IM") traffic to the compromised client based on the received security assessment. The ESAS central server 216 raises an alert for a security analyst (e.g., an administrator) and also logs all of the security assessments and actions invoked.

Figure 7:
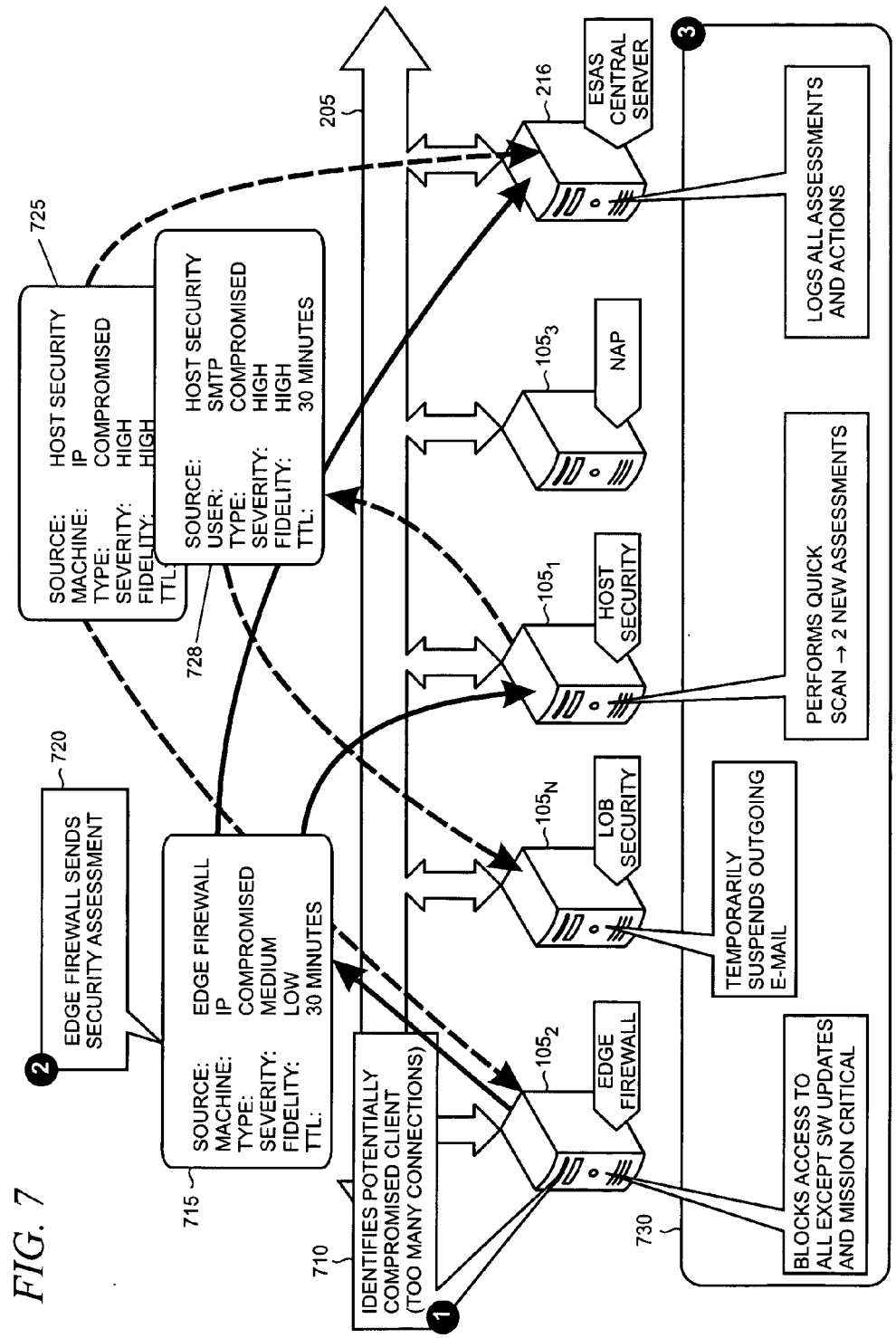
FIG. 7 is a diagram of a second illustrative scenario in which a low fidelity security assessment is sent over the security assessment channel that triggers the generation of a new high fidelity assessment by a receiving ESAS-enabled endpoint which also performs cross-object mapping.

The first illustrative scenario described above provides a case where the endpoint detecting the suspicious incident generates a security assessment with high severity and high fidelity (i.e., the endpoint has a high degree of confidence that it has validly detected a serious incident). By comparison, FIG. 7 is a diagram of a second illustrative scenario in which a low fidelity security assessment is sent over the security assessment channel 205 that triggers the generation of a high fidelity assessment by a receiving endpoint which also performs cross-object mapping.

This second illustrative scenario is also described in three stages. As indicated by reference numeral 710, the edge firewall $105_2$ first detects a large number of client connections to the perimeter network 112 (FIG. 1). However, unlike the first illustrative scenario shown in FIG. 6 and described in the accompanying text, the number of connections being established by the client is not so high that the edge firewall $105_2$ can be absolutely certain that the client has been compromised. In current enterprise security systems, when an endpoint sees such data it generally just drops the data and takes no action as there is not enough evidence to warrant the typically harsh response such as disconnecting the machine. By comparison, in the present scenario the edge firewall $105_2$ in the second stage sends a security assessment 715 over the security assessment channel 205 that indicates that the particular client is compromised with medium severity and low fidelity, as indicated by reference numeral 720.

Here, the subscribing endpoints to the particular object referenced in the security assessment 715 generated by the edge firewall $105_2$ include the host security endpoint 105 and the ESAS central server 216. While such a low fidelity data normally does not trigger an action to be taken at an endpoint in current security products, in accordance with the present enterprise security assessment sharing, the host security endpoint $105_1$ looks at its own local data differently in light of the received security assessment from the edge firewall $105_2$. In this case, the local data resulting from a quick scan at the host security endpoint $105_1$ and the information contained in the security assessment from the edge firewall $105_2$ are used to generate new assessments 725 and 728. Thus, the host security endpoint $105_1$ has information that, by itself, does not warrant the generation of a new security assessment, but when reinforced with even a low fidelity assessment from another endpoint, as in this case, there is sufficient evidence to justify the creation of the new security assessments 725 and 728 which each have high fidelity.

The host security endpoint $105_1$ places the new security assessments 725 and 728 onto the security assessment channel 205. The new security assessments 725 and 728 are received over the security assessment channel 205 by the subscribing endpoints which, in this illustrative scenario, include the edge firewall $105_2$, and the ESAS central server 216 for security assessment 725 and line-of-business endpoint $105_N$ for security assessment 728.

Note that the line-of-business endpoint $105_N$ was not a subscriber to the original security assessment 715 produced by the edge firewall $105_2$ because the reference object type is a machine and the line-of-business endpoint $105_N$, by virtue of its role in protecting e-mail, is typically concerned with the users. However, in this second illustrative scenario the host security endpoint $105_1$ maps from a host object type to a user object type when it generates a new security assessment 728. Such cross object mapping capability may be beneficial in many scenarios as it is contemplated that a high severity incident, such as malware or malicious activity that potentially compromises the data confidentiality or integrity of a host computer, may also potentially compromise the user as well. A security assessment may be generated that cross maps the high severity incident from the host object type to a user object type with a certain degree of fidelity. Similarly, for a critical severity incident in which malware or malicious activity has actually caused a loss of data integrity on a host computer, a security assessment for a user object type may be generated with even higher fidelity.

In stage three, the new security assessments 725 and 728 trigger a variety of respective responsive actions at the receiving endpoints, as collectively indicated by reference numeral 730. Specifically, the edge firewall $105_2$ blocks all access by the compromised client with the exception of software updates and/or mission-critical access. The line-of-business endpoint $105_N$ temporarily suspends outgoing e-mails. And, as with the first illustrative scenario, the ESAS central server 216 continues to log all assessments and actions. As noted above, such restrictions are enforced only during the period of time for which the TTL associated with the new security assessments 725 and 728 remains valid. When the new security assessments expire, the actions taken by the respective endpoints are rolled back unless the TTL is extended or a new security assessment which invokes the restrictive actions is received.

Figure 8:
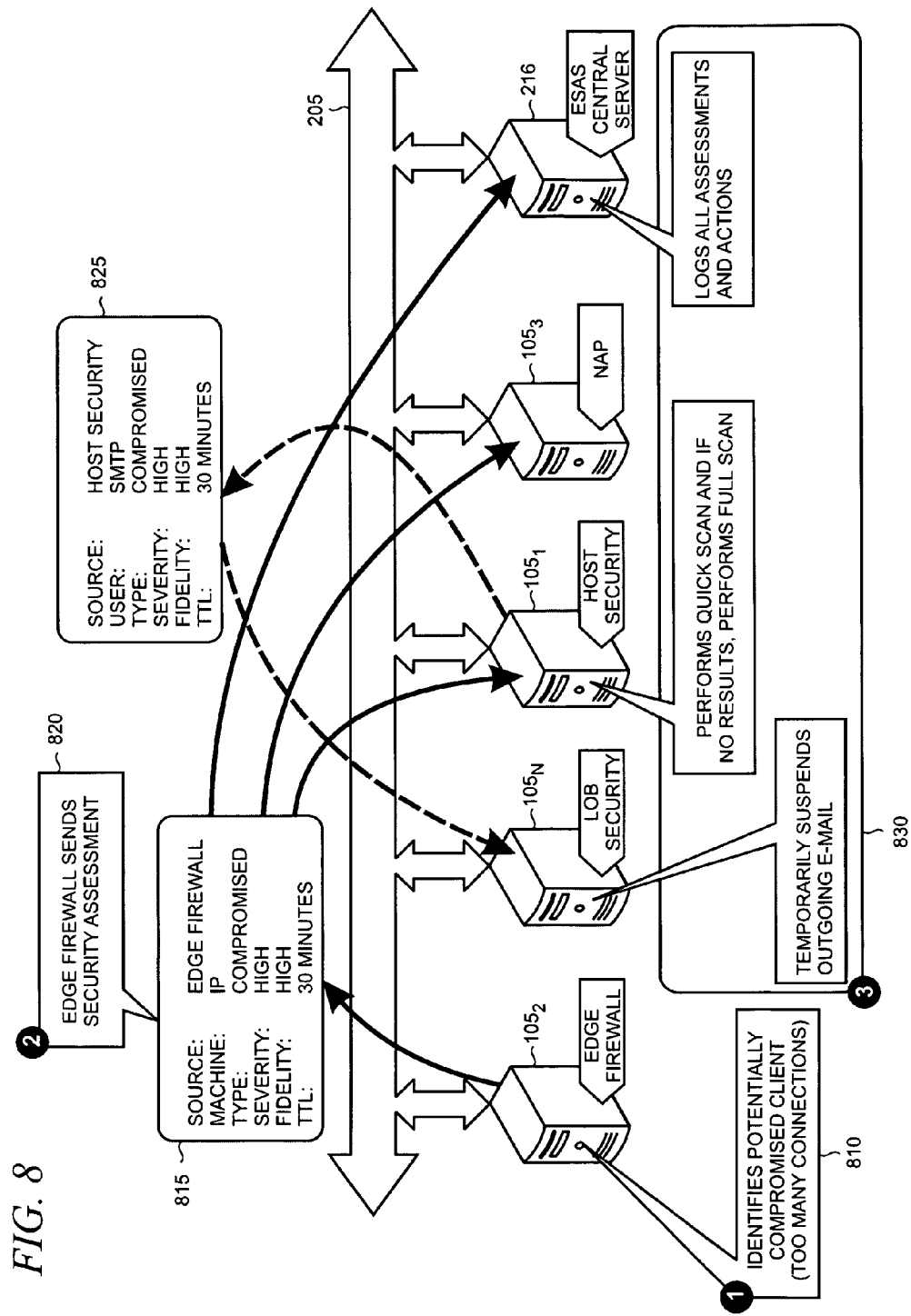
FIG. 8 is a diagram of a third illustrative scenario that shows the targeted use of remediation techniques.

FIG. 8 is a diagram of a third illustrative scenario that shows the targeted use of remediation techniques. This third illustrative scenario is described in three stages. As indicated by reference numeral 810, the edge firewall $105_2$ first detects a large number of client connections to the perimeter network 112 (FIG. 1). Second, the edge firewall $105_2$ sends a security assessment 815 that indicates the particular client is "compromised" with high severity and high fidelity, as indicated by reference numeral 820, over the security assessment channel 205 to subscribing endpoints. The subscribing endpoints include the host security endpoint $105_1$, the NAP endpoint $105_3$, and the ESAS central server 216.

The host security endpoint $105_1$ reviews the received security assessment and applies its specific security expertise using correlation rules and any relevant locally-available data. In this illustrative example, the host security endpoint $105_1$ responsively generates a new security assessment 825 containing a user object type to which the line-of-business security endpoint $105_N$ subscribes.

In the third stage of the scenario, the remediation techniques employed by the endpoints are considered expensive in terms of their potential impact on business operations within the enterprise 100 (FIG. 1). For example, as indicated by reference numeral 830, the line-of-business security endpoint $105_N$ implements a response policy that entails temporarily suspending outgoing e-mail. In addition, the host security endpoint $105_1$ performs a quick scan and if no results are achieved, it then performs a full scan. While such remediation techniques can be very effective in addressing malware, malicious users, and other problems, they typically impart significant expense to the enterprise. For example a user whose outgoing e-mail is suspended will be less productive, and full scanning typically requires one or more reboots which will remove the machine from service for a period of time.

The present ESAS arrangement advantageously enables these effective, albeit expensive, remediation techniques to be applied in a targeted manner, and not merely in a general way or across-the-board which can be unjustified for some machines and/or users. Only objects in the environment that are deemed suspicious, using pre-defined criteria, will be subject to these particular remediation techniques.

Figure 9:
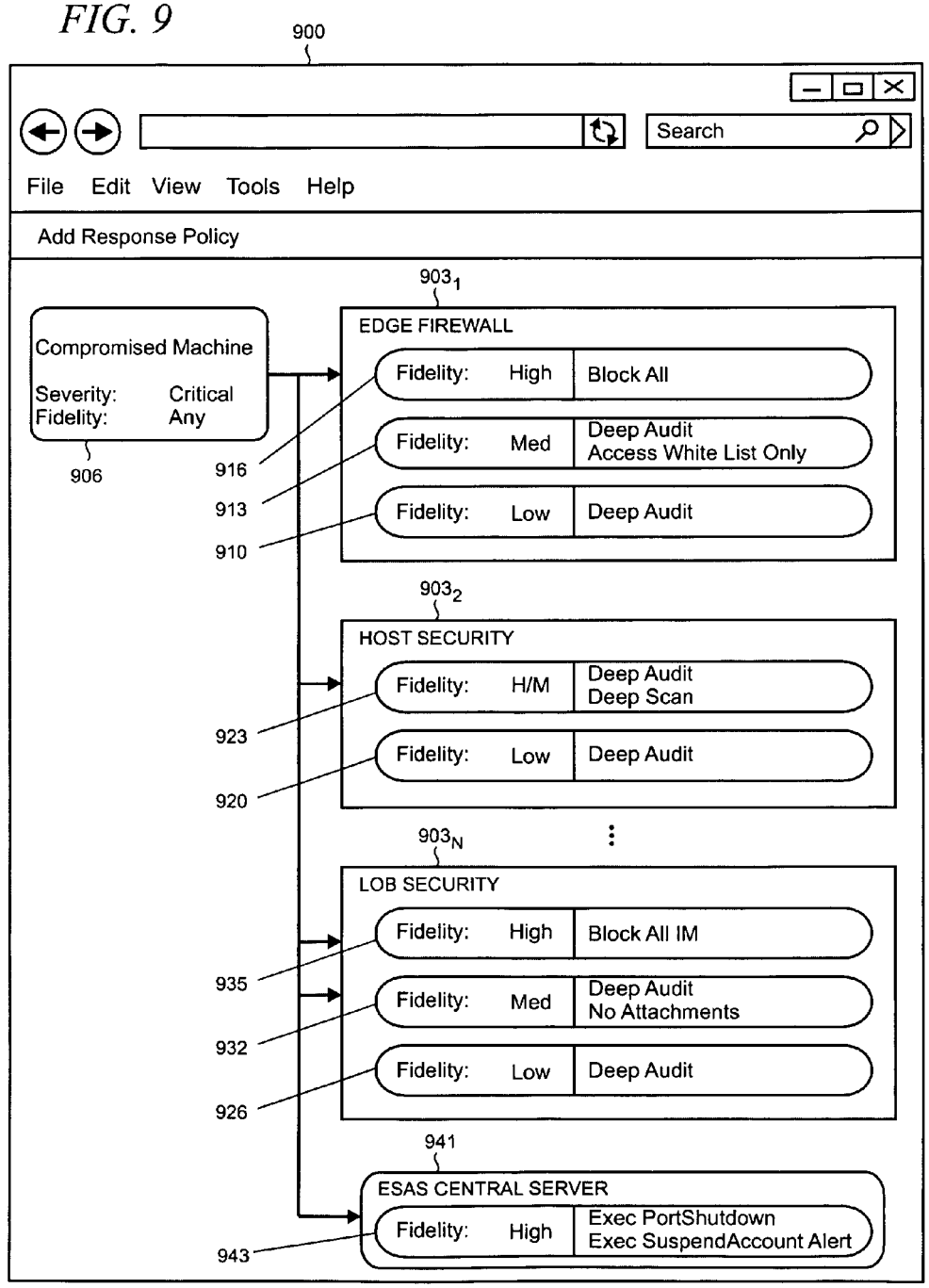
FIG. 9 shows an illustrative screen shot that is provided by a graphical user interface ("GUI") which enables a user, such as an administrator, to manage and define the response policies of ESAS-enabled endpoints in the enterprise.

FIG. 9 shows an illustrative screen shot 900 that is provided by a graphical user interface ("GUI") which enables a user, such as an administrator, to manage and define the response policies of endpoints in the enterprise 100 (FIG. 1). In some applications, the GUI is hosted on the ESAS central server 216 (FIG. 2). Advantageously, the semantic abstraction layer embodied by the security assessments enables enterprise-wide security policies to be established using a very compact and clear methodology. That is, response policies may be configured using a security assessment as a defined starting point without being concerned as to which endpoint in the enterprise created the security assessment, or how the endpoint came to the conclusion reflected in the security assessment. The security assessments, with their compact taxonomy, thus function as natural anchors to enterprise-wide security response policies. Without the present ESAS arrangement to streamline the configuration of response policies, a user would need to consider every event and/or alert that every endpoint could possibly generate, and then define what to do with each such event.

Screen 900 is an illustrative example showing the configuration of enterprise-wide response policies, using fields $903_{1, 2 \ldots N}$ for a number of different endpoints, for the case of an assessment category of a compromised machine with critical severity, which defines a starting point (i.e., "anchor" point) for the response policy configuration as indicated by reference numeral 906. It is emphasized that other user interface screens would be utilized for other assessment categories, object types, severity levels, etc., so that the user is enabled to define response policies for the plurality of different starting points that are likely to be used in a particular enterprise security environment. The response policies, in this particular example, are set depending upon the fidelity of a particular security assessment for a set severity level of "Critical." Fields 903 include a number of respective subfields that are arranged to reflect user-defined input, using for example, text entry boxes, drop-down menus, and the like that are employed in typical GUIs.

As indicated in subfield 910, for a security assessment indicating a compromised machine with critical severity, the edge firewall $105_2$ (FIG. 1) is configured to increase the amount of auditing (i.e., moving to a deep audit level that increases the amount of data collected as compared with a normal level of auditing) when a security assessment has low fidelity. Subfield 913 shows that for an assessment having medium fidelity, the edge firewall $105_2$ increases the auditing level and also restricts Internet access to the suspected compromised machine to only "white list" URLs which typically include sites that are known to not be malicious. When the fidelity is high, as shown by subfield 916, access to the Internet is blocked completely.

Field $903_2$ shows the response policy configuration for the host security endpoint $105_1$ (FIG. 1). For a security assessment having low fidelity and indicating a compromised machine with critical severity, the host security endpoint $105_1$ increases the amount of auditing to a deep audit level, as indicated by subfield 920. Subfield 923 indicates that for the cases of medium and high fidelity, the host security endpoint $105_1$ increases its auditing, and also performs a full or deep scan of it hosts (where a "deep" scan may entail the computer to be rebooted one or more times).

Field $903_N$ shows the response policy configuration for the line-of-business security endpoint $105_N$ (FIG. 1). For a security assessment having low fidelity and indicating a compromised machine with critical severity, the line-of-business security endpoint $105_N$ increases the amount of auditing to a deep audit level, as indicated by subfield 926. Subfield 932 indicates that for a security assessment having medium fidelity, the line-of-business security endpoint $105_N$ increases its data collection to a deep audit, and also restricts file attachments to e-mail. Subfield 935 indicates that for a security assessment having high fidelity, line-of-business security endpoint $105_N$ blocks all instant messaging ("IM") traffic.

Field 941 shows the response policy configuration for the ESAS central server 216 in FIG. 2. For a security assessment having high fidelity, the ESAS central server 216, as indicated in subfield 943, executes a port shutdown for the affected machine and generates an alert that the associated user account has been suspended. As with the subfields discussed above, subfield 943 is typically arranged to accept user-defined input.

Figure 10:
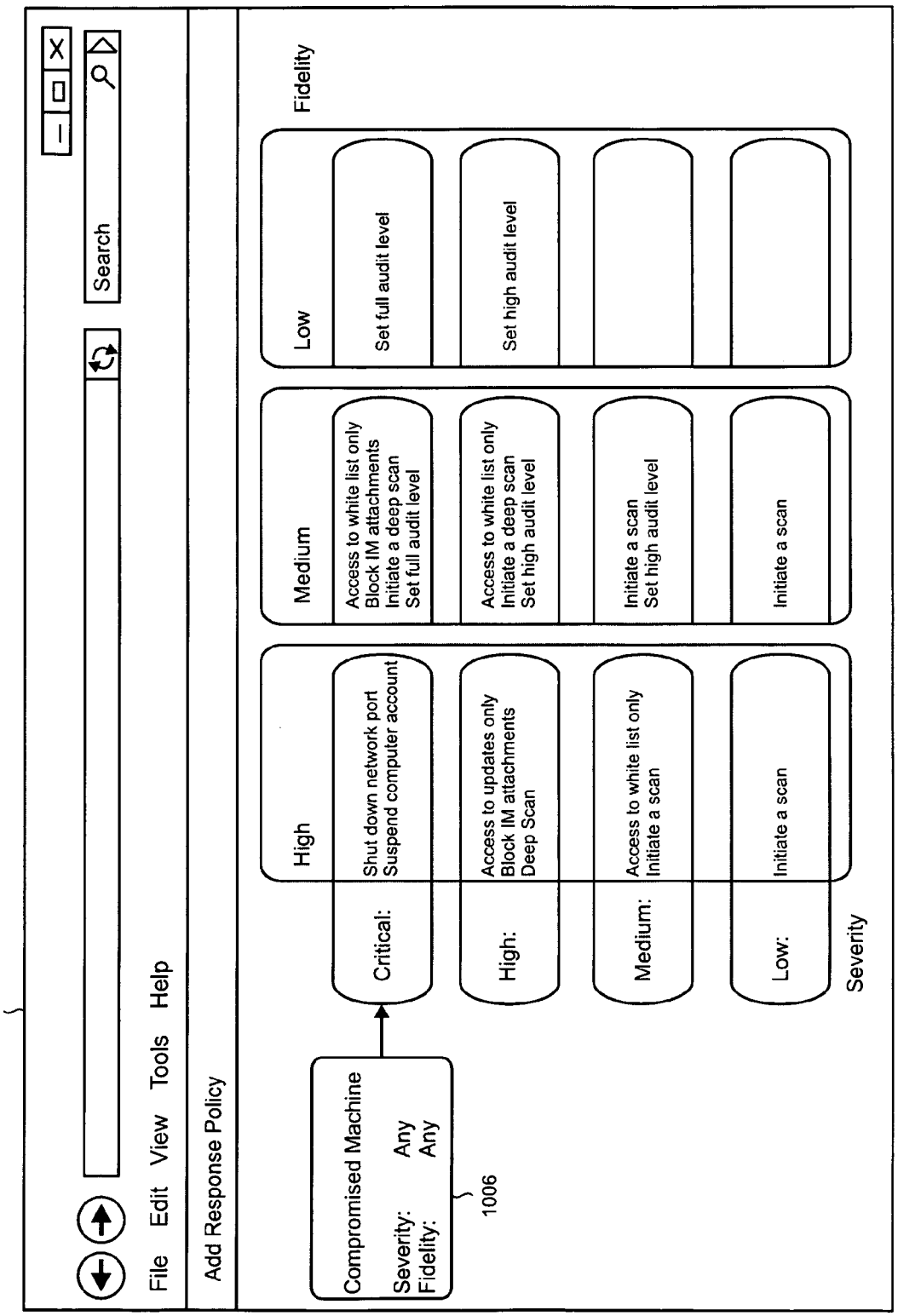
FIG. 10 shows an illustrative screen shot that is provided by a GUI that is arranged to supplement, or be used as an alternative, to the GUI shown in FIG. 9.

FIG. 10 shows an illustrative screen shot 1000 that is provided by a GUI which enables a user, such as an administrator, to manage and define the response policies of endpoints in the enterprise 100 (FIG. 1). This GUI may be used to supplement the arrangement shown in FIG. 9 and described in the accompanying text, or be used as an alternative arrangement. Screen 1000 provides a single view of response policy configuration for an assessment category of "Compromised Machine" for various levels of fidelity and for all levels of severity. In this illustrative example, a security assessment type 1006 having an assessment category of "Compromised" with any severity level is used as the anchor to the response policy configuration shown. It is emphasized that similar screens are contemplated for use with other object types and assessment categories. As with the arrangement shown in FIG. 9 and described in the accompanying text, the arrangement shown in FIG. 10 provides a very compact management interface for defining response policies of endpoints throughout an enterprise.

Turning now to the manual operations which may be supported in most typical ESAS implementations, generally an endpoint 105 will automatically trigger a response when it receives a security assessment according to a response policy, unless the response is marked, typically by a network or ESAS system administrator, as requiring manual approval. The functionality attendant to the manual operations may be supported by the ESAS central server 216 in some cases, or alternatively be provided as new functionality which may be added to conventional administrator consoles, or network management operations products.

Figure 11:
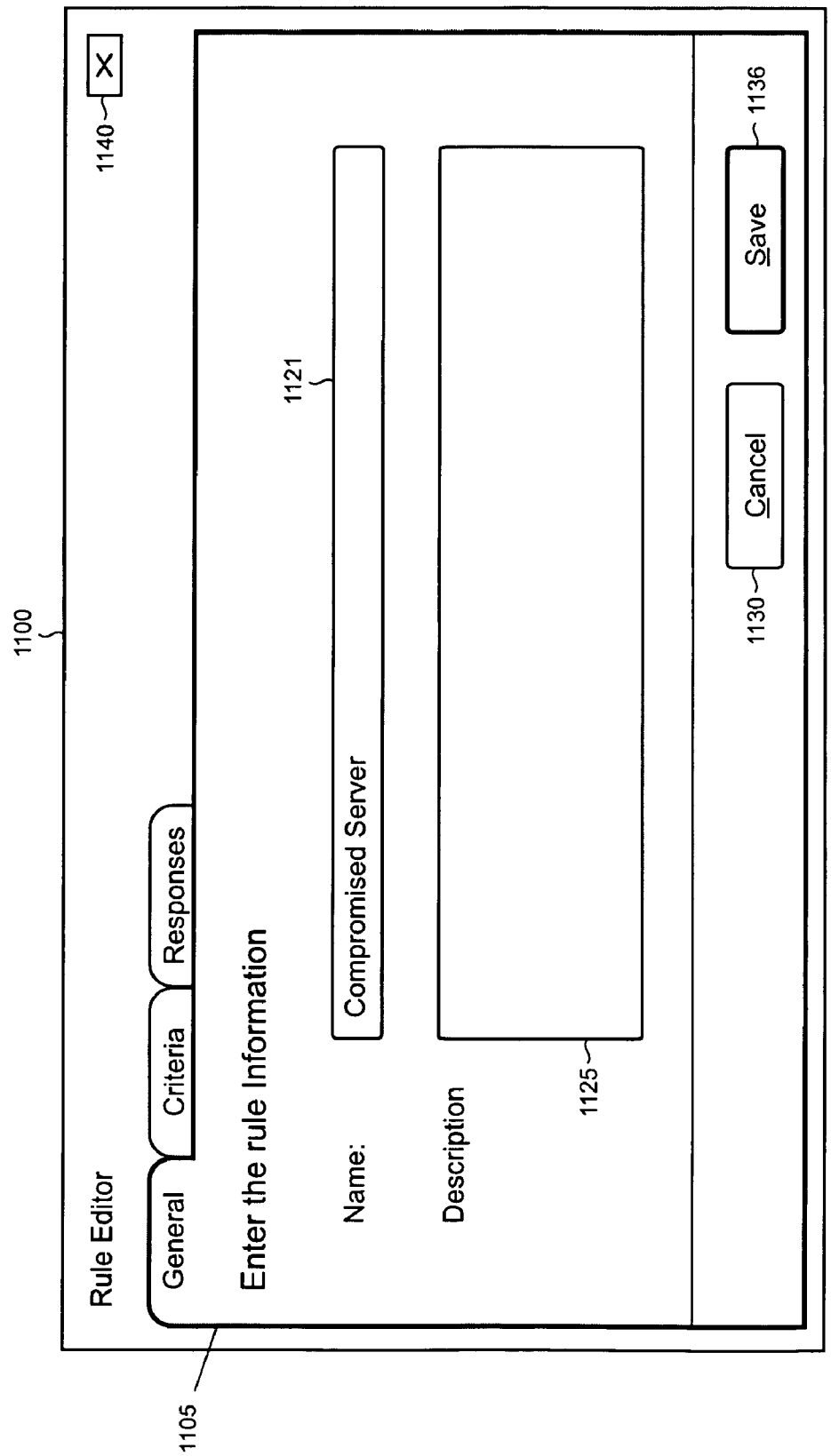
FIG. 11 shows a screen shot of an illustrative GUI that supports a rule editor that an administrator may use to configure rules supporting manual operations that are applicable to ESAS-enabled endpoints.

FIG. 11 shows a screen shot 1100 of an illustrative GUI that supports a rule editor that an administrator may use to configure manual approval for certain responses while allowing other responses to be taken automatically by the endpoints 105. Under the "General" tab 1105 in the rule editor, the administrator is provided with two text entry boxes in which information including the name and description of a rule may be entered, as respectively indicated by reference numerals 1121 and 1125. As shown in this example, the administrator has entered the name of a rule as "Compromised Server." Typical UI controls such as a cancel button 1130, save button 1136, and window close icon 1140 are also supported by the rule editor GUI.

Figure 12:
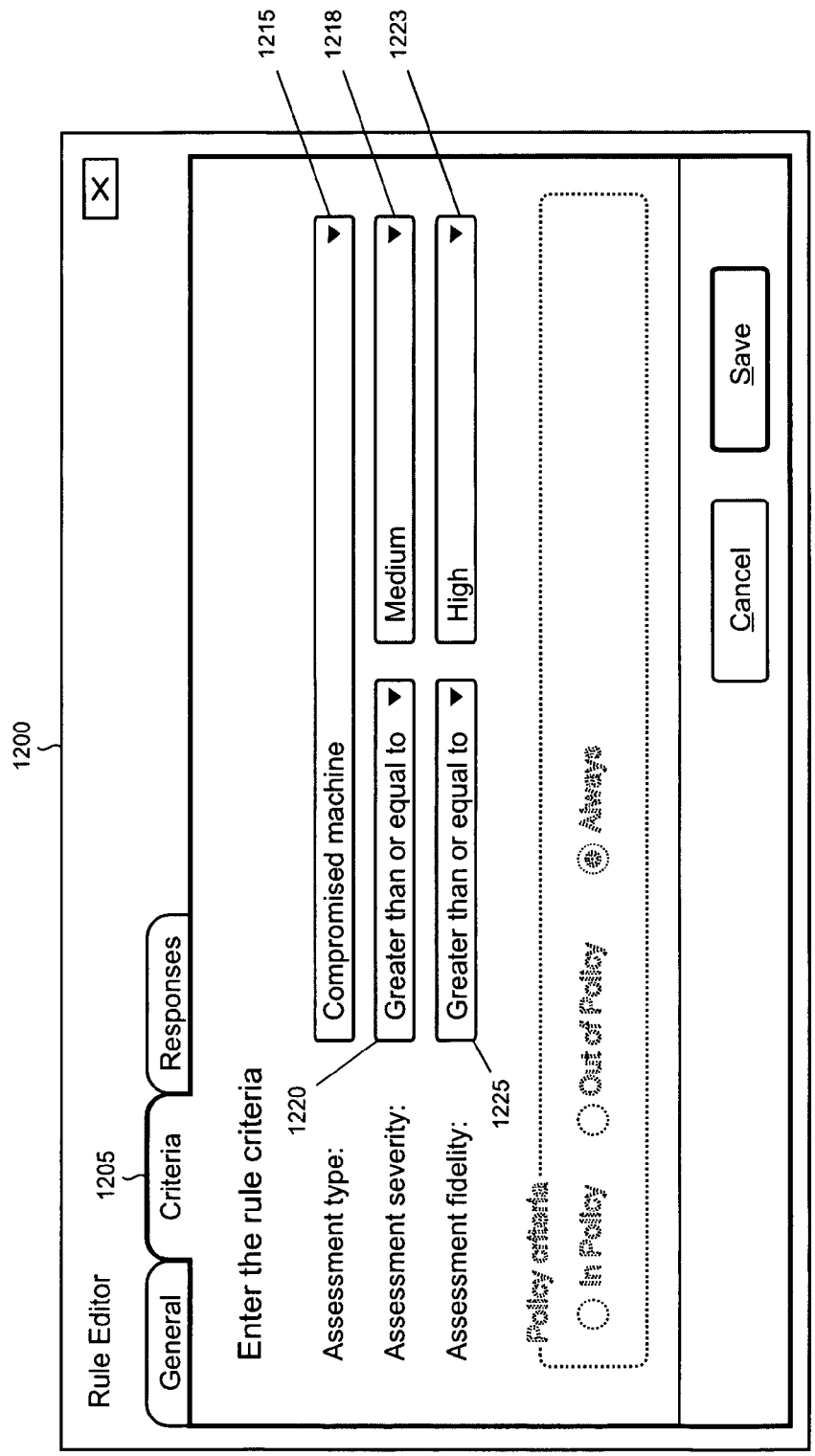
FIG. 12 shows a second screen shot of the illustrative rule editor.

FIG. 12 shows a screen shot 1200 of the illustrative rule editor GUI where, under the "Criteria" tab 1205, the administrator is provided with a number of drop down menus from which the rule criteria may be selected for the "Compromised Server" rule entered under the "General" tab 1105, as shown in FIG. 11. The rule criteria include assessment type, severity, and fidelity. For the assessment type, a drop down menu 1215 typically provides a multiplicity of predefined assessment types from which the administrator may choose. These may include, for example, one or more of the assessment categories or types shown in Table 1 above. In this example, the administrator has selected "Compromised machine," as shown.

The administrator may select rule criteria to be applied to the assessment severity using the drop down menu 1218 which provides one or more predefined levels of severity from which to choose—for example, low, medium, high, and critical. As shown, the administrator has selected "medium" in this example. A drop down menu 1220 provides a qualifier for the assessment severity. The qualifier may be used to define a range of severities that will be included in the rule. For example, the severity must be greater than or equal to, or less than the predefined value selected by the administrator in the drop down menu 1218. Here in this example, the administrator has indicated that the assessment severity be greater than or equal to medium in order for the rule criteria to apply.

Similar drop down menus are provided in the rule editor for assessment fidelity and the qualifier, as respectively indicated by reference numerals 1223 and 1225. In this example, as shown, the assessment fidelity must be greater than or equal to high.

Figure 13:
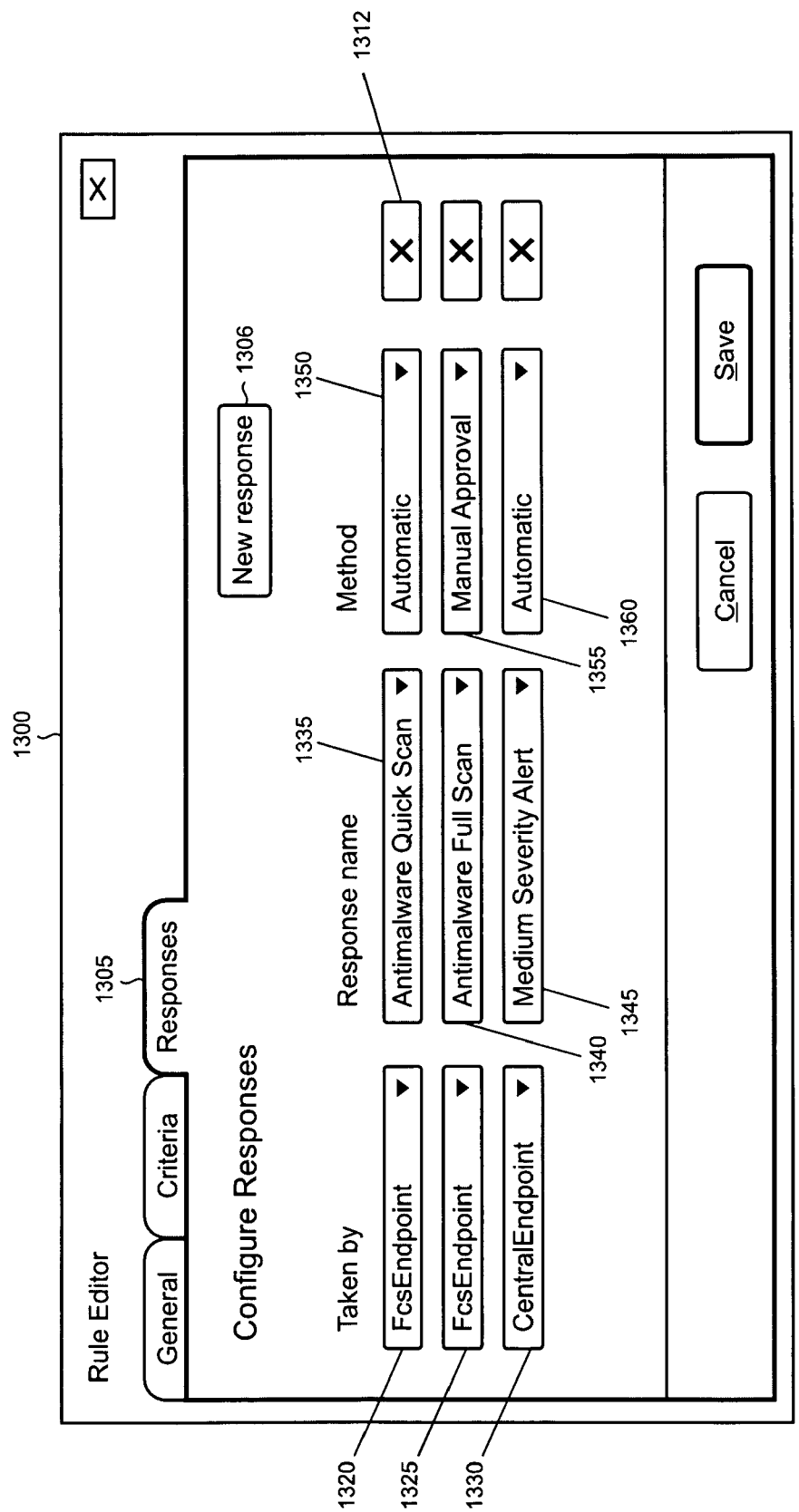
FIG. 13 shows a third screen shot of the illustrative rule editor.

Under the "Responses" tab 1305 of the rules editor as shown in the illustrative screen shot 1300 in FIG. 13, the administrator may configure the responses taken by various endpoints and the method (automatic, or requiring manual approval) by which the response is implemented. The rule editor is arranged to add new responses using a "New Response" button 1306. Configured responses may also be deleted by an administrator by using a delete icon, as representatively indicated by reference numeral 1312. It is noted that it is not necessary for every endpoint to respond or take an action in response to a given security assessment, so the Responses tab 1305 provides an easy and flexible way for the administrator to add, configure, and delete responses as may be required to meet the needs of a particular scenario.

In this example, there are three responses which have been configured using drop down menus 1320, 1325, and 1330 which enable the administrator to select from a number of different endpoints in the ESAS system 200 for which to configure responses. In this example, the responses are taken by an FcsEndpoint (e.g., host security endpoint 105₁) and a CentralEndpoint (e.g., ESAS central server 216).

Using drop down menus 1335, 1340, and 1345, the administrator can typically pick from a variety of predefined responses. In this example, the response names include an anti-malware quick scan and an anti-malware full scan as respective responses to be taken by the host security endpoint 105₁. As shown in the illustrative scenario in FIG. 8 and described in the accompany text, the host security endpoint 105₁ may be configured in some cases, to perform the quick scan of host machines in an enterprise in response to a received security assessment that meets the applicable rule criteria, but then perform a full scan if the quick scan produces no results. However, as shown in the drop down menu 1355, which indicates the response method for the full scan, the administrator has selected that the full scan response requires manual approval before being taken by the host security endpoint. The manual approval required for the full scan contrasts with the automatic response that the administrator has selected from the drop down menu 1350 for the anti-malware quick scan.

The different response methods selected by the administrator in this example helps to highlight a significant feature provided by the present manual operations functionality where the administrator may tailor the responses to fit a particular scenario. In this case, as noted above in the text accompanying FIG. 8, a full scan typically requires one or more reboots of a host machine in order to be completed. As such activity can remove the machine from service for a period of time, and thus impact productivity, the administrator has chosen here to be given the opportunity to manually approve the full scan response before it is taken by the host security endpoint 105₁. However, the quick scan which can typically be performed in an unobtrusive manner with very little or no impact to productivity, is chosen by the administrator in this example to be performed automatically.

Another reason for implementing manual approval for responses taken by endpoints in the ESAS system 200 is that an administrator may wish to gain some experience with a particular set of response policies and verify that the responses are appropriately scoped and correctly implemented before enabling their automatic triggering. This situation may occur, for example, when an ESAS system is being deployed for the first time.

Also shown in FIG. 13 is the administrator's selection of an automated method in drop down menu 1360 for the medium severity alert response that is selected from drop down menu 1345. In this case, the ESAS central server 216 will raise a medium severity alert automatically when it receives a security assessment which meets the applicable rule criteria (i.e., indicating a compromised machine having at least medium severity and high fidelity in this example). It is noted that the screen shots shown in FIGS. 11-13 are representative of screens used by the GUI that supports the rule editor, and other similar screens are contemplated as being used as may be necessary to implement a particular desired functionality.

The manual operations supported in typical ESAS systems may also include manual cancellation. As the ESAS central server 216 (or alternatively a separate admin console) is generally configured to subscribe to all security assessments that are published by the endpoints 105, an administrator may readily review all active assessments (i.e., those which have a TTL value that is unexpired). In some cases, the administrator may wish to cancel an active security assessment and have the responses implemented by the endpoints in response to that assessment rolled back.

The reasons for cancelling the assessment may vary, but generally the administrator will cancel a security assessment because it is no longer relevant. This situation will typically result from one of two scenarios. In the first scenario, the administrator reviews a security assessment, and generally after performing some investigation believes the detected security incident which triggered the security assessment is a false positive, and thus the resulting assessment is not correct. In the second scenario, the administrator reviews the security assessment, but in this case after performing the investigation determines that the security incident detected by the endpoint is a true positive. However, the administrator is able to fix or resolve the security issue at hand that caused the security assessment to be generated. In both cases, the administrator is provided with an ability to manually cancel the security assessment and roll back the associated responses that may have been taken by the endpoints.

Figure 14:
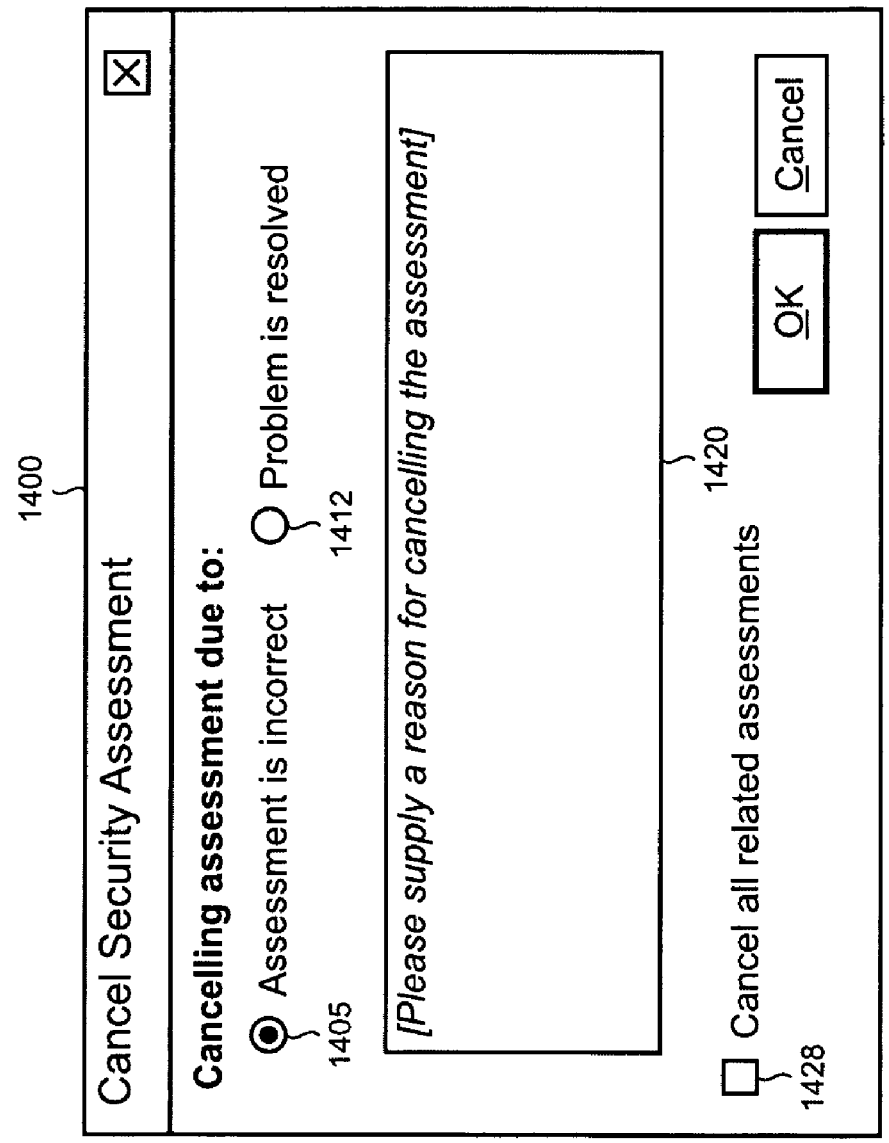
FIG. 14 shows a screen shot of an illustrative GUI that an administrator may use to manually cancel a security assessment.

FIG. 14 shows a screen shot 1400 provided by an illustrative GUI that an administrator may use to manually cancel a security assessment. As shown, the administrator is provided with radio buttons 1405 and 1412 to indicate if the security assessment is being cancelled due to a false positive or incorrect security assessment or if the underlying security issue was resolved. In addition, a text entry box 1420 is provided so that the administrator may supply a detailed reason as to why the security assessment is being cancelled. A check box 1428 is also provided so that the administrator may choose to cancel all related security assessments. Such related security assessments could include, for example, those that are generated by an endpoint and published into the security assessment channel 205 in response to the received security assessment. (Recall that an illustrative scenario in which a received security assessment triggers endpoints to generate new security assessments was previously discussed in the text accompanying FIG. 7).

The information collected by the manual cancellation GUI is typically collected and logged by the ESAS central server 216 for auditing or other analytical or forensic purposes. For example, the information pertaining to false positives may be correlated with other information and used in some cases to improve the accuracy and reliability of detection of security incidents by endpoints. In this manner, a learning system may be implemented that utilizes the user-feedback provided via the manual cancellations.

When a security assessment has been manually cancelled, a message is forwarded via the security assessment channel 205 to all the endpoints so that any responses taken by those endpoints are rolled back. In addition, the endpoint that originally published the security assessment that got manually cancelled is suppressed from generating any new security assessments about the same object and detected security incident for a period of time equal to the TTL in the original security assessment.

Figure 15:
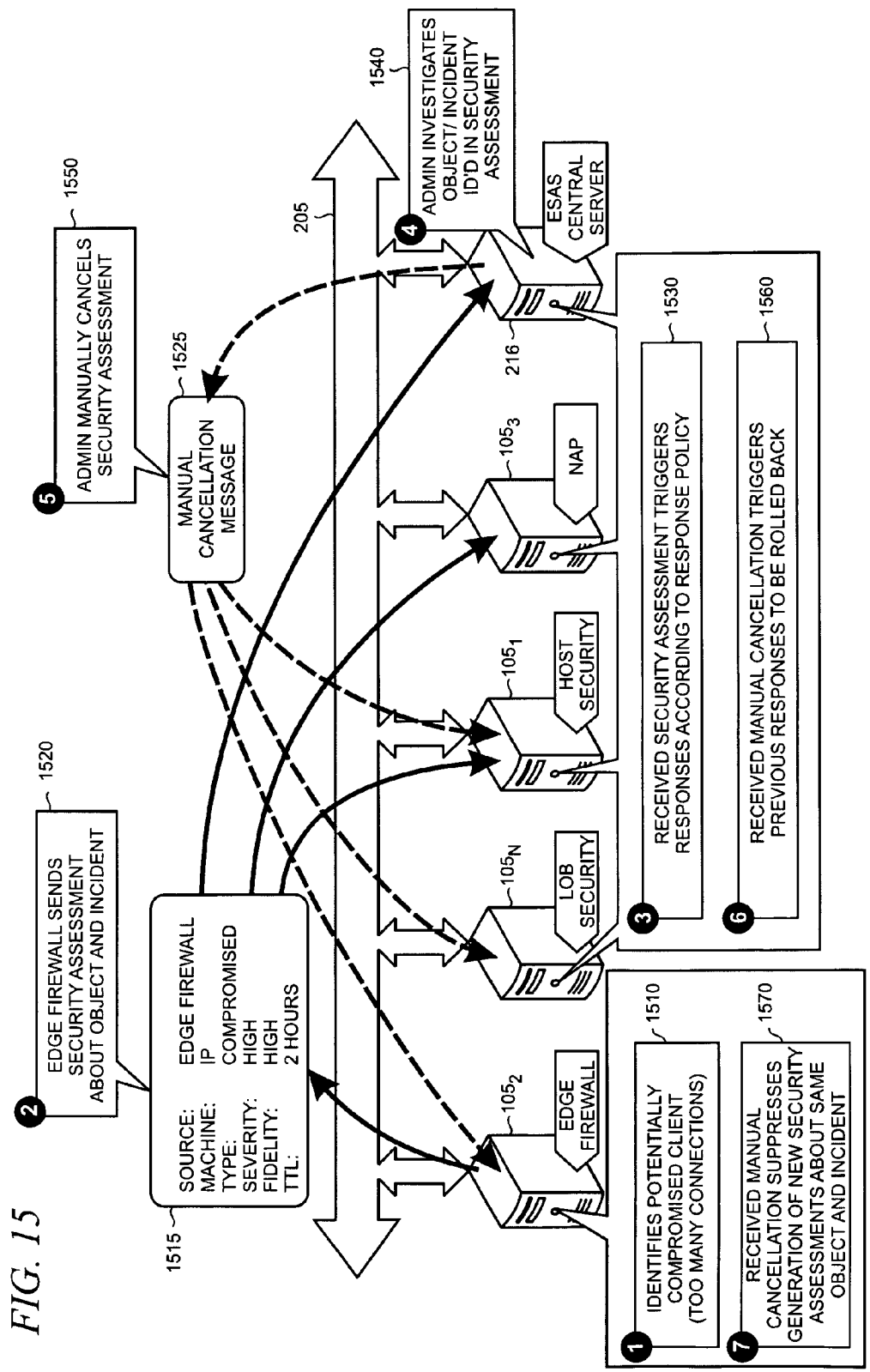
FIG. 15 shows an illustrative scenario in which a security assessment is manually cancelled and generation of new security assessments by an endpoint is suppressed.

FIG. 15 provides an illustrative scenario which shows manual cancellation of a security assessment and suppression of the generation of new security assessments. The scenario is described in seven stages. As indicated by reference numeral 1510, the edge firewall $105_2$ first detects a large number of client connections to the perimeter network 112 (FIG. 1). Second, the edge firewall $105_2$ sends a security assessment 1515 over the security assessment channel 205 to subscribing endpoints that indicates the particular client machine is "compromised" with high severity and high fidelity with a TTL value of two hours, as indicated by reference numeral 1520. The subscribing endpoints, in this example, include the host security endpoint $105_1$, the NAP endpoint $105_3$, and the ESAS central server 216.

In stage three, the security assessment 1515 triggers a variety of respective responsive actions at the receiving endpoints, as collectively indicated by reference numeral 1530, in accordance with applicable response policy. For example, the responses could be similar to those shown in FIG. 8 and described in the accompanying text.

As noted above, the ESAS central server 216 may be configured to raise an alert for an administrator or security analyst when incoming security assessments are received. In stage four, the administrator's review of the incoming security assessment 1515 prompts an investigation of the detected security incident (i.e., too many connections from a client machine) that is described by the security assessment 1515, as shown by reference numeral 1540.

In this example, after completing the investigation, the administrator decides to manually cancel the security assessment 1515, as shown at stage five by reference numeral 1550, because it is determined that the security incident detected by the edge firewall $105_2$ is a false positive. The ESAS central server 216 sends a manual cancellation message 1525 over the security assessment channel 205 to all the endpoints 105.

At stage 6 as shown by reference numeral 1560, when the manual cancellation message 1525 is received, each endpoint 105 which took a response at stage 3 rolls back the response.

The manual cancellation message 1525 is further utilized, at stage seven shown by reference numeral 1570, to implement suppression of any new security assessments that the edge firewall $105_2$ might otherwise want to generate about the security incident that was the subject of the original security assessment 1515. For example, if the edge firewall $105_2$ continues to see the same pattern of activity at the same machine that prompted the publication of the original security assessment 1515 (in this case, too many connections) then, because the original security assessment 1515 is no longer active by reason of the cancellation, it would ordinarily fire a new security assessment describing this security incident into the security assessment channel 205.

But allowing such endpoint behavior to occur could undermine the effectiveness of the manual cancellation and waste resources (e.g., administrator's time). Accordingly, the suppression feature ensures that an endpoint will not attempt to generate any new security assessments in cases, as in the scenario shown in FIG. 15, when a prior (i.e., original) security assessment dealing with the same object and incident had already been generated but then manually cancelled. The period of suppression will typically be equal to the TTL value of that prior security assessment. In this example, the generation of new security assessments by firewall $105_2$ will be suppressed for a period of two hours beginning at the time the original security assessment 1515 was generated and published by the end firewall $105_2$.

During this time period, the endpoint under suppression is free to generate and publish security assessments in a normal manner for other detected security incidents that deal with different objects and/or issues. So, for example, the edge firewall $105_2$ may generate a new security assessment indicating that a different machine is compromised if it detects too many connections being used. Likewise, the edge firewall $105_2$ may issue a new security assessment for the same machine covered by the original security assessment 1515, but for a different reason. And once the suppression period expires, which in this example is two hours, the restrictions are lifted and the edge firewall $105_2$ is free to issue new security assessments about the same security incident described in the original security assessment 1515 if it sees the same pattern of activity occurring again.

Figure 16:
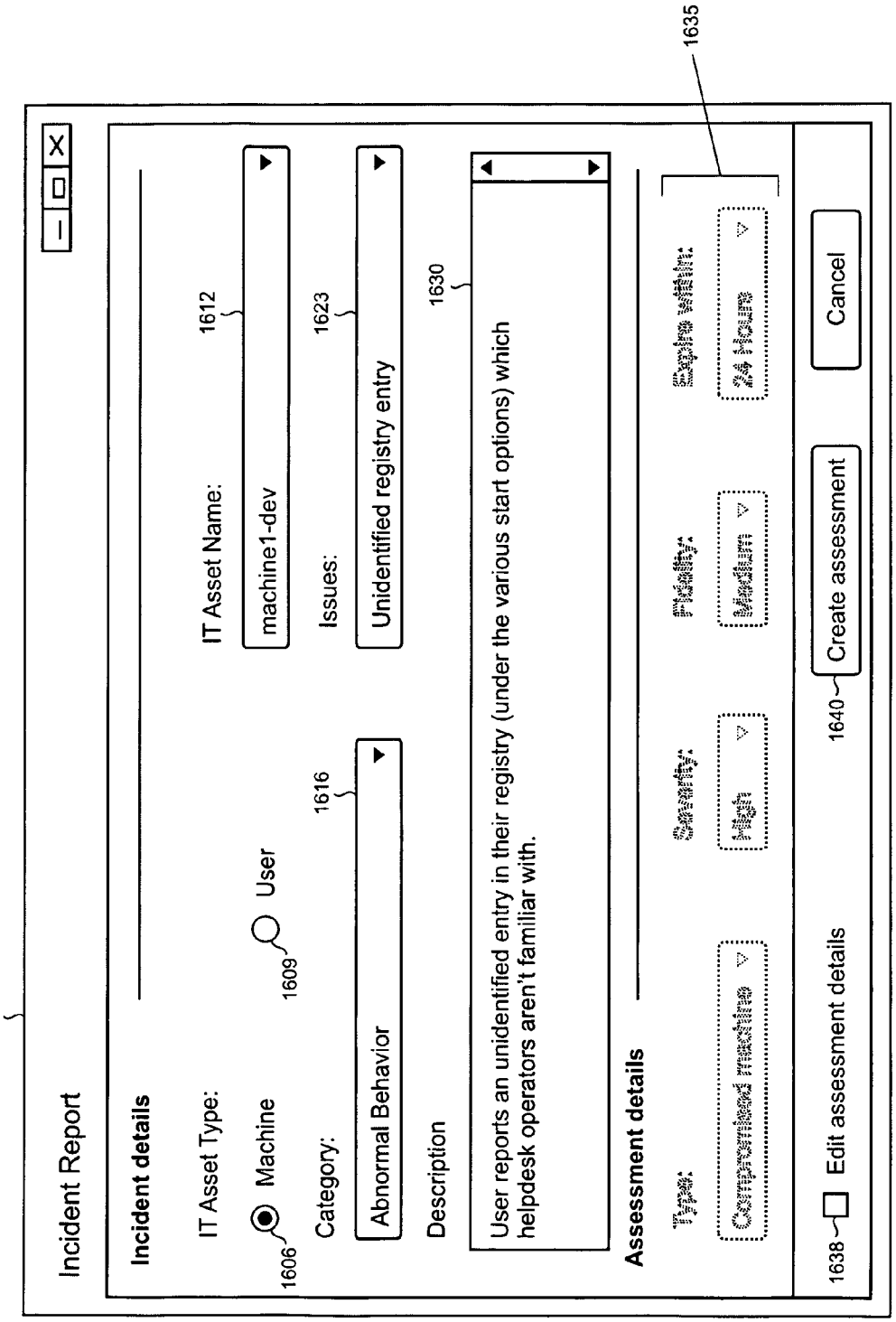
FIG. 16 shows a screen shot of an illustrative GUI that supports manual injection of a security assessment into the security assessment channel by an administrator.

FIG. 16 shows a screen shot 1600 of an illustrative GUI that supports another aspect of manual operations where an administrator may generate a security assessment and manually inject it into the security assessment channel 205 where it is received by the endpoints 105. The manual injection GUI is typically used when an administrator learns of a security incident, for example, through an investigation of an issue, or from a telephone call from a user reporting unusual behavior of a host machine or URL of an external resource such as a website.

Using a streamlined, fill-in form with drop down menus and text entry boxes provided by the manual injection GUI the administrator can readily manually generate a new security assessment that uses the same compact and precise vocabulary as those assessments that are generated in an automated fashion by the endpoints in the ESAS system 200. That is, the manually generated security assessment will typically include assessment category, severity, fidelity, and TTL. In this example, the particular values for these properties will be automatically set for a given security assessment based on the input provided by the administrator into the GUI form.

Typically, the manual injection GUI is designed to make it easy for the administrator to describe the issue at hand. For example, the form presents multiple predefined choices from which the administrator may select, and may accommodate the use of high-level descriptions of the problem. Alternatively or to supplement the menu choices, the manual injection GUI may be arranged to pose leading questions As shown, the manual injection GUI allows the administrator to generate a security assessment about a particular security incident for object types (i.e., information technology ("IT") assets) representing either a machine or user by selecting one of the appropriate radio buttons 1606 or 1609. The name of the IT asset may be selected from a drop down menu 1612 which would typically include the names of the IT assets used in an enterprise that are monitored by the ESAS system 200.

The administrator may select from one of several predefined categories of incidents from the drop down menu 1616. In this example, the administrator has selected that the incident relates to abnormal machine behavior. Other choices could include, for example, unusual or suspicious URLs, or issues with users.

More specific issues may also be selected by the administrator from drop down menu 1623. In this example, the administrator has indicated that the issue is related to an unidentified entry in the host computer's system registry. Other issues could include, for example, applications that cannot be shut down, unexpected pop ups, and the like. A text entry box 1630 is provided for the administrator to provide a high-level description of the problem which can be utilized for auditing, incident correlation, and analytical purposes, for example.

As noted above, the particular details of the security assessment will be automatically generated based on the administrator's input into the manual injection GUI form. In this example, accordingly, the details for the security assessment (as collectively indicated by reference numeral 1635) which indicates a compromised machine with high severity, medium fidelity, and a TTL value of 24 hours are displayed by the manual injection GUI, but are "grayed out." That is, the details are not editable by the administrator unless the "Edit Assessment Details" check box 1638 is selected. In that case, the administrator may make manual adjustments to the default security assessment by selecting other details. For example, the administrator may wish to change the severity to medium from the default value of high.

Once the administrator has completed the form provided by the manual injection GUI and made any desired adjustments, the security assessment is injected into the security assessment channel 205 when the administrator uses the create assessment button 1640. The endpoints 105 in the ESAS system 200 will treat a manually injected security assessment just as it would treat assessments that are generated and published by any endpoint. When the manually injected security assessment is received, the endpoints 105 would invoke a response in accordance with the applicable response policies.

Manual injection provides an effective way to supplement the automated detection capabilities of the ESAS system 200. While such automated detection can be expected to be satisfactory in many cases, it is recognized that by being rules-based the detection cannot cover one hundred percent of all the potential security incidents and threats to an enterprise. Accordingly, an administrator may use a manually injected security assessment to educate the ESAS system 200 about a security incident. This enables the endpoints 105 in the system 200 to responsively trigger actions in accordance with the system's response policies, as well as correlate the information from the manually injected security assessment with locally-available information at the endpoints which may result in the detection of other incidents.

Figure 17:
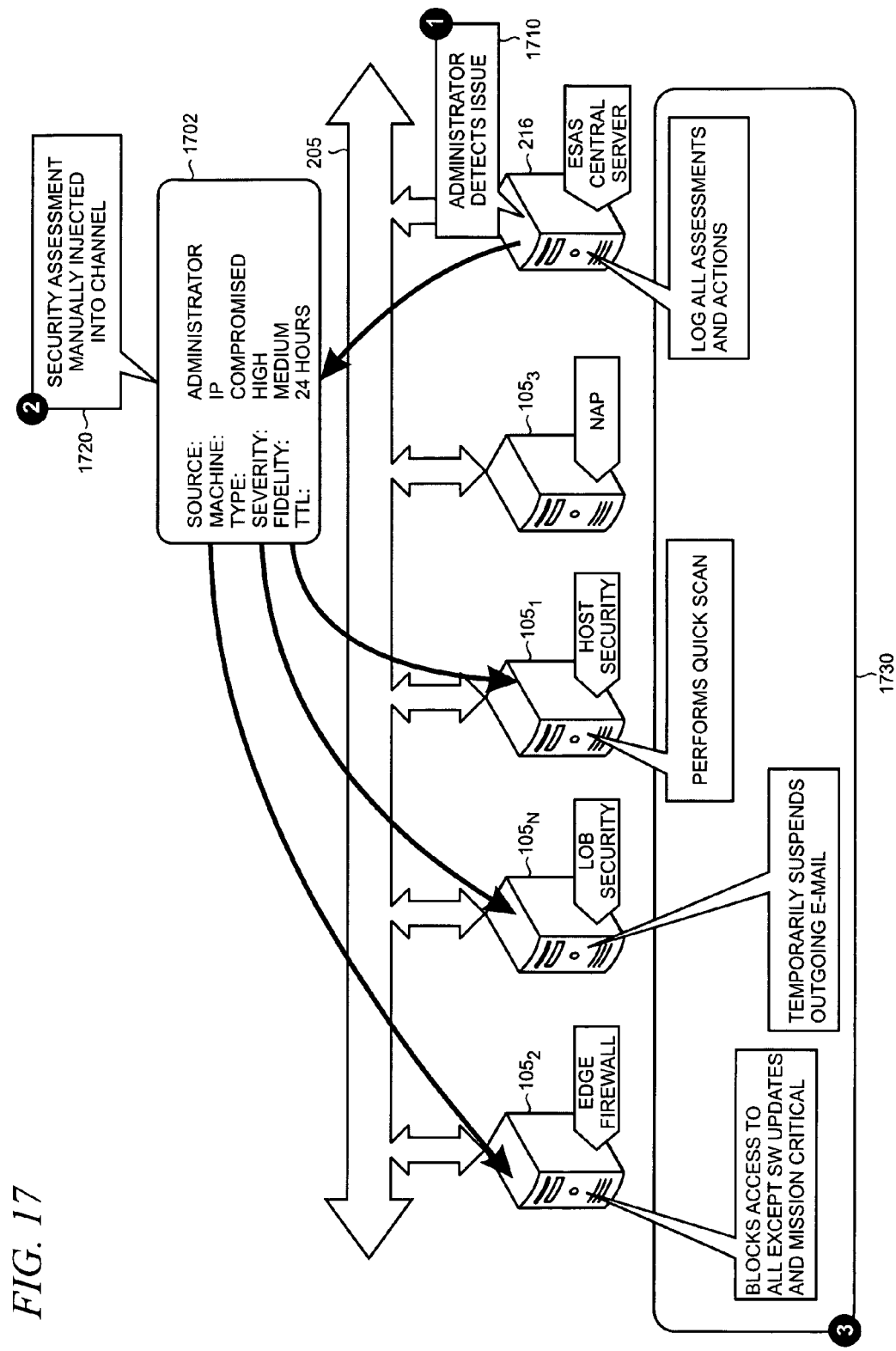
FIG. 17 is a diagram of an illustrative scenario in which a plurality of ESAS-enabled endpoints are coupled to a security assessment channel and a manually injected security assessment triggers responses at multiple endpoints.

FIG. 17 is a diagram of an illustrative scenario in which a plurality of ESAS-enabled endpoints 105 are coupled to the security assessment channel 205 and a manually injected security assessment 1702 triggers responses at multiple endpoints. This illustrative scenario is described in three stages. As indicated by reference numeral 1710, an administrator detects a security incident at the first stage. As noted above, this detection could occur, for example via an investigation by the administrator or from a report from a user in the enterprise.

At 1720, the security assessment 1702 is created and injected into the security assessment channel 205 using the manual injection GUI shown in FIG. 16 and described in the accompanying text. As shown, the security assessment 1702 includes properties that match those shown in FIG. 16, namely that the administrator has identified a compromised machine with high severity, medium fidelity, and a TTL value of 24 hours.

In this example, the subscribing endpoints include the host security endpoint $105_1$, edge firewall $105_2$, and line-of-business security endpoint $105_N$. At the third stage in the scenario, the subscribing endpoints apply their specific security expertise through the application of their own correlation rules and locally-available data, and in accordance with the applicable response policies, to trigger a response. As collectively indicated by reference numeral 1730, a variety of responsive actions are triggered at the endpoints. Specifically, the edge firewall $105_2$ blocks access by the compromised machine to resources with the exception of software updates or mission-critical access. The line-of-business endpoint $105_N$ temporarily suspends outgoing e-mails, and the host security endpoint $105_1$ performs a quick scan of its protected host machines. The ESAS central server 216 logs all security assessments and actions, including manually injected security assessments and resulting responses at the endpoints 105.

Figure 18:
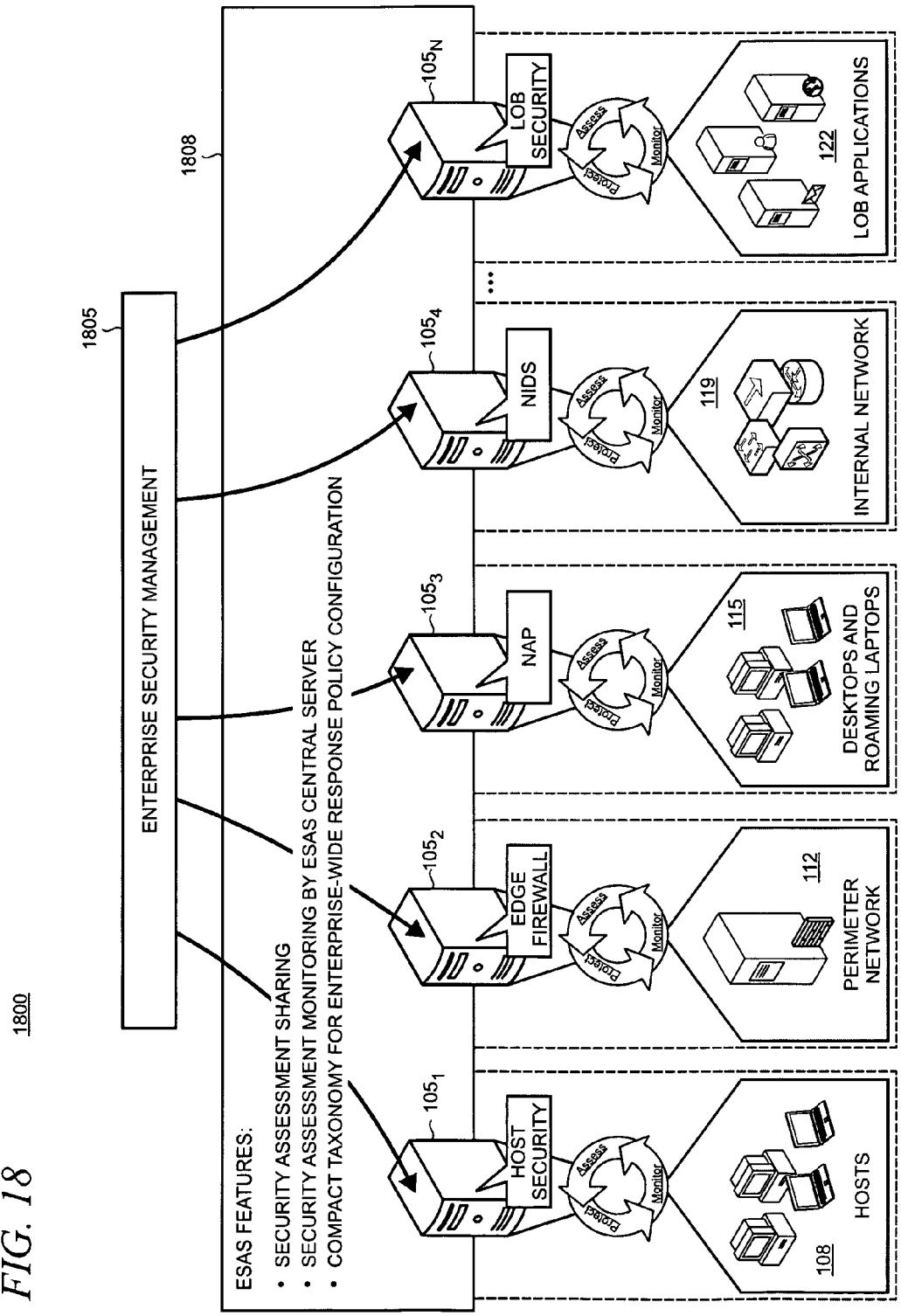
FIG. 18 shows an illustrative enterprise security arrangement in which the present ESAS feature set provides an enterprise security management layer functionality.

FIG. 18 shows an illustrative enterprise security arrangement 1800 in which the present ESAS feature set—including security assessment sharing, security assessment monitoring by ESAS central server (as described in the text accompanying FIG. 2), and compact taxonomy for enterprise-wide response policy configuration (as described in the text accompanying FIGS. 9 and 10)—functions as an enterprise security management layer 1805. That is, the ESAS feature set, indicated by reference numeral 1808, is commonly shared among all of the endpoints in the enterprise environment, and is not limited to being part of a single enterprise security product island. The semantic abstraction layer formed by the security assessments shared over the security assessment channel 205 (FIG. 2) enables a single and consistent management interface to be utilized to thereby create a more integrated approach to enterprise security.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for facilitating manual approval of a response prior to the response being taken by an endpoint in an enterprise network, the method comprising the steps of:

utilizing a security assessment schema in which security assessments of security incidents are generated by a plurality of endpoints in the enterprise network, the security assessments i) using a pre-defined taxonomy to provide contextual meaning to the security incidents, ii) being categorized by type, and iii) being published into a security assessment channel that is shared among the plurality of endpoints;

implementing response policies, the response policies describing the responses taken by the endpoint after receiving the security assessment from the channel and the response policies further identifying a subset of responses that are subject to manual approval before being performed by the endpoint; and providing a user interface for receiving input to the response policies from the user, the user interface being configured to enable designation of the subset of responses that are subject to manual approval.

2. The method of claim 1 in which the security assessment is arranged for providing an assignment of context by an endpoint to security-related information using a pre-defined taxonomy.

3. The method of claim 2 in which the pre-defined taxonomy utilizes a schematized vocabulary comprising object types and assessment categories.

4. The method of claim 3 in which the object types include at least one of host, user, service, data, or enterprise.

5. The method of claim 2 in which the security assessment comprises a plurality of fields, at least one of which is a fidelity field that is arranged to express a degree of confidence an endpoint has in the security assessment.

6. The method of claim 2 in which the security assessment comprises a plurality of fields, at least one of which is a time-to-live field that is arranged to express an estimate by an endpoint for a time period for which the security assessment is expected to be valid.

7. The method of claim 1 in which at least one of the endpoints in the plurality of endpoints comprises a security solution object, the object selected from one of security product, security solution, management product, management solution, security service, or management service.

8. The method of claim 1 in which the user interface comprises a rule editor and including a further step of configuring the rule editor to enable addition of responses to the response policies, deletion of responses from the response policies, and configuration of responses in the response policies.

9. A method for facilitating manual cancellation of a security assessment, the method comprising the steps of:
receiving, over a security assessment channel, the security assessment from an endpoint in a enterprise network, the security assessment describing a security incident and being based at least in part on locally-available information about a system being monitored by the endpoint, the security assessment being arranged to provide contextual meaning to the security incident and being defined with a time period over which the security assessment is valid;
providing a user interface by which the received security assessment may be reviewed; and
configuring the user interface to enable manual cancellation of the security assessment, the manual cancellation being usable to effectuate roll-back of local actions taken by one or more endpoints in the enterprise network in response to the security assessment.

10. The method of claim 9 including a further step of sending a message to indicate the manual cancellation to the one or more endpoints.

11. The method of claim 9 including a further step of suppressing generation of a new security assessment describing the security incident by the endpoint when the security assessment is manually cancelled, the suppressing being performed over the time interval.

12. The method of claim 9 in which the locally-available information further comprises one or more local actions previously taken by the endpoint.

13. The method of claim 9 including a further step of rolling back the local action once the security assessment is no longer valid.

14. The method of claim 9 including a further step of configuring the user interface to accept a high-level description of a reason for the manual cancellation, the reason being used for one of audit, correlation, or forensic analysis.

15. A method for manually injecting a security assessment into an enterprise security environment that includes a plurality of security endpoints, the method comprising the steps of:
providing a user interface for describing an object in the environment using a security assessment which is arranged to provide a semantic abstraction of security-related information that is available in the environment, the semantic abstraction i) being categorized by type, and ii) being commonly utilizable by the plurality of security endpoints; and
responsively to input at the user interface, injecting the security assessment into a communication channel that is commonly shared by the plurality of security endpoints in order to trigger a response at one or more of the security endpoints using the semantic abstraction of the security-related information.

16. The method of claim 15 in which the security assessment is further arranged for providing an assignment of context to the security-related information based on input to the user interface.

17. The method of claim 15 in which the user interface includes a fill-in form having one or more drop down menus from which a user may select from predefined criteria for describing the object.

18. The method of claim 15 in which the object is one of user, machine, external resource that is described by a URL, or enterprise.

19. The method of claim 15 in which the security assessment is further defined by one of fidelity, severity, or time-to-live.

20. The method of claim 15 including a further step of correlating the injected security assessment with other security-related information to enhance detection of security incidents in the enterprise security environment.

* * * * *